(12) United States Patent
Filippi et al.

(10) Patent No.: US 10,810,771 B2
(45) Date of Patent: Oct. 20, 2020

(54) SYSTEMS AND METHODS FOR RENDERING A VISUALIZATION USING EVENT DATA

(71) Applicant: Splunk Inc, San Francisco, CA (US)

(72) Inventors: Nicholas Filippi, Atherton, CA (US); Simon Fishel, San Francisco, CA (US); Siegfried Puchbauer-Schnabel, San Francisco, CA (US); Mathew Elting, San Francisco, CA (US); Carl Yestrau, San Francisco, CA (US)

(73) Assignee: SPLUNK INC., San Francisco, CA (US)

(*) Notice: Subject to any disclaimer, the term of this patent is extended or adjusted under 35 U.S.C. 154(b) by 65 days.

(21) Appl. No.: 16/034,143

(22) Filed: Jul. 12, 2018

(65) Prior Publication Data

US 2019/0213765 A1  Jul. 11, 2019

Related U.S. Application Data

(63) Continuation of application No. 14/697,283, filed on Apr. 27, 2015, now Pat. No. 10,049,473.

(51) Int. Cl.
*G06T 11/20* (2006.01)
*G06F 16/9038* (2019.01)

(52) U.S. Cl.
CPC ........ *G06T 11/206* (2013.01); *G06F 16/9038* (2019.01); *G06T 2200/24* (2013.01)

(58) Field of Classification Search
CPC .................................................. G06T 11/206
USPC ......................................................... 715/781
See application file for complete search history.

(56) References Cited

U.S. PATENT DOCUMENTS

| | | | |
|---|---|---|---|
| 7,680,809 B2 * | 3/2010 | Deng | G06F 11/302 707/706 |
| 9,245,057 B1 | 1/2016 | Fletcher et al. | |
| 9,626,088 B2 | 4/2017 | Ma et al. | |
| 9,648,037 B2 | 5/2017 | Merza | |
| 9,875,576 B2 | 1/2018 | Bergman et al. | |
| 10,049,473 B2 * | 8/2018 | Filippi | G06T 11/206 |
| 2007/0132767 A1 | 6/2007 | Wright et al. | |
| 2008/0109761 A1 | 5/2008 | Stambaugh | |
| 2009/0100357 A1 * | 4/2009 | Signorini | G06F 3/04812 715/760 |
| 2009/0172511 A1 | 7/2009 | Decherd et al. | |
| 2010/0185984 A1 | 7/2010 | Wright et al. | |
| 2011/0181597 A1 | 7/2011 | Cardno et al. | |
| 2011/0225525 A1 | 9/2011 | Chasman et al. | |
| 2011/0246914 A1 | 10/2011 | Solaja et al. | |
| 2011/0249003 A1 | 10/2011 | Mercuri | |
| 2012/0089610 A1 | 4/2012 | Agrawal et al. | |

(Continued)

*Primary Examiner* — William D Titcomb

(57) ABSTRACT

Embodiments of the disclosure are systems and methods for providing third party visualizations. In one embodiment, a method is provided that includes receiving, via an API, computer-executable instructions configured to render a visualization using events and a variable field; rendering the visualization using the events; causing displaying of a graphical user interface (GUI) comprising a visualization panel and a variable element; receiving, via the variable element of the GUI, an indication of a first change in the value of the variable field to a first value; re-rendering the visualization using the events and the first value; and causing display of the GUI with an updated visualization panel and the variable element.

40 Claims, 19 Drawing Sheets

(56) References Cited

U.S. PATENT DOCUMENTS

| | | |
|---|---|---|
| 2012/0148088 A1 | 6/2012 | Mital et al. |
| 2012/0200567 A1 | 8/2012 | Mandel et al. |
| 2013/0031499 A1 | 1/2013 | Vishnubhatta et al. |
| 2013/0187926 A1 | 7/2013 | Silverstein et al. |
| 2013/0249917 A1* | 9/2013 | Fanning ............... G06T 11/206 345/440 |
| 2013/0318603 A1 | 11/2013 | Merza |
| 2014/0043325 A1* | 2/2014 | Ruble ................. G06F 3/04842 345/419 |
| 2014/0218383 A1* | 8/2014 | Srivastava ............. G06F 40/14 345/589 |
| 2014/0258817 A1 | 9/2014 | Carrier et al. |
| 2014/0267294 A1* | 9/2014 | Ma ...................... H05K 999/99 345/440 |
| 2015/0019537 A1 | 1/2015 | Neels et al. |
| 2015/0095841 A1* | 4/2015 | Fiedler ............... G06F 16/2423 715/781 |
| 2015/0213631 A1 | 7/2015 | Vander Broek |
| 2016/0065858 A1 | 3/2016 | Kimber et al. |
| 2016/0180556 A1* | 6/2016 | Deng ..................... G06F 16/26 345/440 |
| 2016/0196688 A1 | 7/2016 | Bergman et al. |
| 2016/0231900 A1* | 8/2016 | Meaney ................ G06F 16/954 |
| 2016/0314605 A1 | 10/2016 | Filippi et al. |

\* cited by examiner

1500

Original Search: 1501
search "error" | stats count BY host

Sent to peers: 1502
search "error" | prestats count BY host(map)

Executed by search head: 1503
Merge prestats results received from peers (reduce)

| Data Summary | | | |
|---|---|---|---|
| Hosts (5) | Sources (8) | Sourcetypes (3) | |
| Host | | Count | Last Update |
| mailsv | | 9,829 | 4/29/14 1:32:47.000 PM |
| vendor_sales | | 30,244 | 4/29/14 1:32:46.000 PM |
| www1 | | 24,221 | 4/29/14 1:32:44.000 PM |
| www2 | | 22,595 | 4/29/14 1:32:47.000 PM |
| www3 | | 22,975 | 4/29/14 1:32:46.000 PM |

*FIG. 10B*

SYSTEMS AND METHODS FOR RENDERING A VISUALIZATION USING EVENT DATA

CROSS-REFERENCE TO RELATED APPLICATIONS

The present application is a Continuation of, claims the benefit of and priority to U.S. application Ser. No. 14/697,283, filed Apr. 27, 2015, entitled "SYSTEMS AND METHODS FOR PROVIDING FOR THIRD PARTY VISUALIZATIONS" and hereby incorporated by reference in its entirety.

TECHNICAL FIELD

The present disclosure is generally directed to data visualizations, and more particularly, to systems and methods for providing third party visualizations.

BACKGROUND

Information systems generate vast amounts and wide varieties of machine-generated data such as activity logs, error logs, configuration files, network messages, database records, etc. This machine-generated data may be difficult to understand or process without a visual representation for easier data consumption by users. Data visualizations may be used to clearly and efficiently communicate information to users. Examples of data visualizations may include tables, pie charts, column charts, time graphs, and the like. Effective visualization helps users in analyzing data, detecting operation trends, and measuring system performance. Data visualizations may make complex data more accessible, understandable and usable. Users may have particular analytical tasks, such as making comparisons or understanding causality.

BRIEF DESCRIPTION OF THE DRAWINGS

FIG. 9 illustrates an example search query received from a client and executed by search peers in accordance with the disclosed embodiments.

FIG. 10B illustrates an example data summary dialog that enables a user to select various data sources in accordance with the disclosed embodiments.

DETAILED DESCRIPTION

Figure 1:
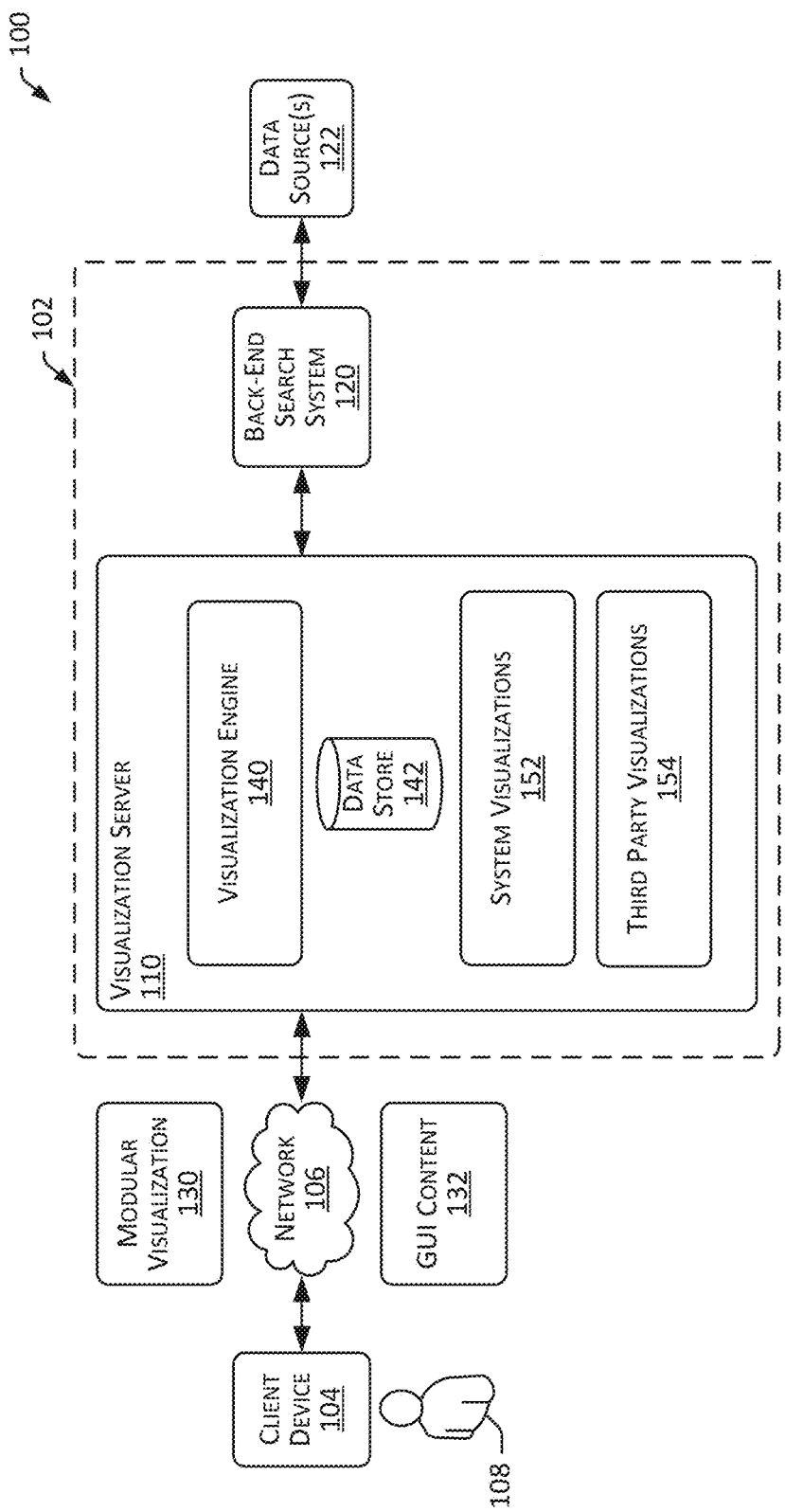
FIG. 1 illustrates an example data processing environment in accordance with the disclosed embodiments.

Throughout this description for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the described embodiments.

The present disclosure is directed to providing third party visualizations. As described herein, in some embodiments, an application program or website may provide an application programming interface (API) for developers to create and add visualizations that may be rendered using machine-generated data (e.g., events, which may be machine-generated data associated with a respective timestamp). In some embodiments, for example, the visualizations may be generated by end-users. The computer-executable code for a visualization may be received from a developer via an API, along with one or more variable fields. The visualization may be configured to be rendered using machine-generated data and values of the one or more variable fields. The variable fields may be presented to the end-user via a graphical user interface (GUI). The end-user may change the value of one or more variable fields, each of which would cause a change in the visualization. The visualization may be re-rendered and displayed to the end-user in response to receiving a change in any variable field. In some embodiments, visualizations may be rendered using one or more different programming languages, such as JavaScript. In some embodiments, the developer and end-user may be the same person or persons. As used herein, the term "users" may be used to refer to developers and/or end-users of the visualizations.

In some instances, the visualizations which are part of the application program or website as well as visualizations received from users (e.g., third parties) may be presented to users via an interactive visualization graphical user interface (GUI). The GUI may include a menu panel corresponding to each of the available visualizations (e.g., native to application or website, received from users). Upon selection of a visualization received from a user, the GUI may render the visualization using and/or based on input data (e.g., machine-generated data) provided by one or more data sources. In some embodiments, the GUI may also use the value(s) of the one or more variable fields to render the visualization. In some embodiments, the data may be obtained via one or more searches of machine-generated data. For example, searches of machine-generated data can be employed to identify data used to render visualizations, including searches employing late binding schema and are described in more detail below with regard to at least FIGS. 5-11D. In the context of machine-generated data, data sources can include, for example, applications, application servers, web servers, databases, networks, virtual machines, telecom equipment, operating systems, sensors, and/or the like. Although certain data sources are described herein for the purpose of illustration, embodiments can include any variety of data sources. Some example of data sources are described in more detail below with regard to at least FIGS. 5-11D.

Turning now to the figures, FIG. 1 illustrates an example data processing environment ("environment") 100 in accordance with the disclosed embodiments. In some embodiments, the environment 100 can include a visualization system 102 and a client device 104 communicatively coupled to one another via a communications network 106. The client device 106 may be used or otherwise accessed by a user 108, such as a system administrator or a customer. The visualization system 102 may include a visualization server 110 communicatively coupled to a back-end search system 120. The back-end search system 120 may be the same or similar to that of search system 1100 described in more detail below with regard to at least FIG. 5. For example, the back-end search system 120 may include data sources, forwarders, indexers, index data stores, search heads and/or the like components that facilitate the intake, storage and searching of machine-generated data. In some embodiments, the back-end search system 120 is communicatively coupled one or more data sources 122.

The network 106 may include an element or system that facilitates communication between the entities of the environment 100, including, for example, the visualization server 110, the one or more client devices 104, and/or the like. The network 106 may include an electronic communications network, such as the Internet, a local area network (LAN), a wide area network (WAN), a wireless local area network (WLAN), a cellular communications network, and/or the like. In some embodiments, the network 106 can include a wired or a wireless network. In some embodiments, the network 106 can include a single network or a combination of networks.

A client device 104 may include any variety of electronic devices. In some embodiments, a client device 104 can include a device capable of communicating information via the network 106. A client device 104 may include one or more computer devices, such as a desktop computer, a server, a laptop computer, a tablet computer, a wearable computer device, a personal digital assistant (PDA), a smart phone, and/or the like. In some embodiments, a client device 104 may be a client of the visualization server 110. In some embodiments, a client device 104 can include various input/output (I/O) interfaces, such as a display (e.g., for displaying graphical user interfaces (GUIs)), an audible output user interface (e.g., a speaker), an audible input user interface (e.g., a microphone), an image acquisition interface (e.g., a camera), a keyboard, a pointer/selection device (e.g., a mouse, a trackball, a touchpad, a touchscreen, a gesture capture or detecting device, or a stylus), and/or the like. In some embodiments, a client device 104 can include general computing components and/or embedded systems optimized with specific components for performing specific tasks. In some embodiments, a client device 104 can include programs/applications that can be used to generate a request for content, to provide content, to render content, and/or to send and/or receive requests to and/or from other devices via the network 106. For example, a client device 104 may include an Internet browser application or a local data search and reporting application that facilitates communication with servers, such as the visualization server 110, via the network 106. In some embodiments, a program or application of a client device 104 can include program modules having program instructions that are executable by a computer system to perform some or all of the functionality described herein with regard to a client device 104. In some embodiments, a client device 104 can include one or more computer systems similar to that of the computer system 1000 described below with regard to at least FIG. 4.

The visualization server 110 may include a computing device having network connectivity and being capable of providing one or more services to network clients, such as a client device 104. These services can include, for example, providing an application programming interface for receiving modular visualizations 130 (e.g., data that may include variables and computer-executable instructions configured to render a visualization using input data and one or more variable fields), generating and displaying GUIs to receive additional user information, such as editor options, generating and displaying GUIs for visualizations of input data, storing modular visualizations, ingesting, processing, storing, monitoring, searching data and/or serving content, such as visualization GUI content 130. The visualization server 110 may include a visualization engine 140 and a data store 142. The visualization engine 140 may provide for executing some or all of the functionality described herein with regard to the visualization engine 140 and/or the visualization server 110. The data store 142 may include a medium for the storage of data thereon. For example, the data store 142 may include a non-transitory computer-readable medium storing the visualization engine 140 (e.g., storing the executable code of the visualization engine 140), a listing of available system visualizations 152 (also known as native visualization), a listing of third party visualizations 154, and/or the like. As described herein a listing of available system visualizations 152 may include a listing of available visualizations available from the visualization framework or visualization system 102. A listing of third party visualizations 154 may include a listing of available visualizations received from users 108 and/or third party vendors. Although certain embodiments are described with regard to a single visualization server 110 for the purpose of illustration, embodiments can include employing multiple visualization servers 110, such as a plurality of distributed visualization servers 110. In some embodiments, the visualization server 110 can include one or more computer systems similar to that of the computer system 1000 described below with regard to at least FIG. 4.

As noted above, the visualization server 110 may be in communication with one or more components of a back-end search system 120. In some embodiments, the back-end search system 120 can be similar to that of search system 1100 described in more detail below with regard to at least FIG. 5. For example, the back-end search system 120 can include one or more data sources ("sources") (e.g., sources 1105 of FIG. 5), one or more forwarders (e.g., forwarders 1101 of FIG. 5), one or more indexers (e.g., indexers 1102 of FIG. 5), one or more index data stores (e.g., data stores 1103 of FIG. 5), and/or one or more search heads (e.g., search head 1104 of FIG. 5). As described in more detail below with regard to at least FIGS. 5-11D, in the context of monitoring machine-generated data, forwarders may provide for collecting machine-generated data from one or more data sources, such as data streaming from packaged and custom applications, application servers, web servers, databases, wire data from networks, virtual machines, telecom equipment, operating systems, sensors, and/or the like. Indexers may provide for receiving, indexing, storing, and/or searching the machine-generated data received from the forwarders. Search heads may provide for servicing search requests (e.g., search requests received from the visualization server 110), including distributing search tasks to one or more indexers, receiving one or more search results from the one or more indexers and merging the search results received from the one or more indexers. A search head may provide the search results to the visualization server 110. In some embodiments, the visualization server 110 serves search results and reports to the client device 104 for presentation to the user 108 (e.g. via one or more third party visualizations). Although the visualization server 110 is illustrated as a component that is separate from the back-end search system 120 for the purpose of illustration, embodiments can include the visualization server 110 and/or its functionality being included in or integrated with one or more components of the back-end search system 120. For example, some or all of the components and functionality of the visualization server 110 can be integrated with or provided by a search head of the back-end search system 120.

As described herein, the visualization engine 140 may be deployed on the visualization server 110, and the deployment of the visualization engine 140 can include configurations of the visualization engine itself, as well as related software and hardware. For example, a deployment of the visualization engine 140 can include the application and/or the search system 120 being configured to receive machine-generated data from one or more data sources 122. In some embodiments, the visualization engine 140 can serve visualization GUI content 130 to the client device 104 for display to the user 108. In some embodiments, the visualization GUI content 130 can include one or more interactive GUIs (e.g., an interactive visualization dashboard or visualization GUI) that facilitate a user selecting a system visualization 152 and/or a third party visualization 154. The visualization GUI content 130 may also enable a user to change one or more variable values via variable elements of the visualization GUI via the visualization GUI content 130.

Figure 2A:
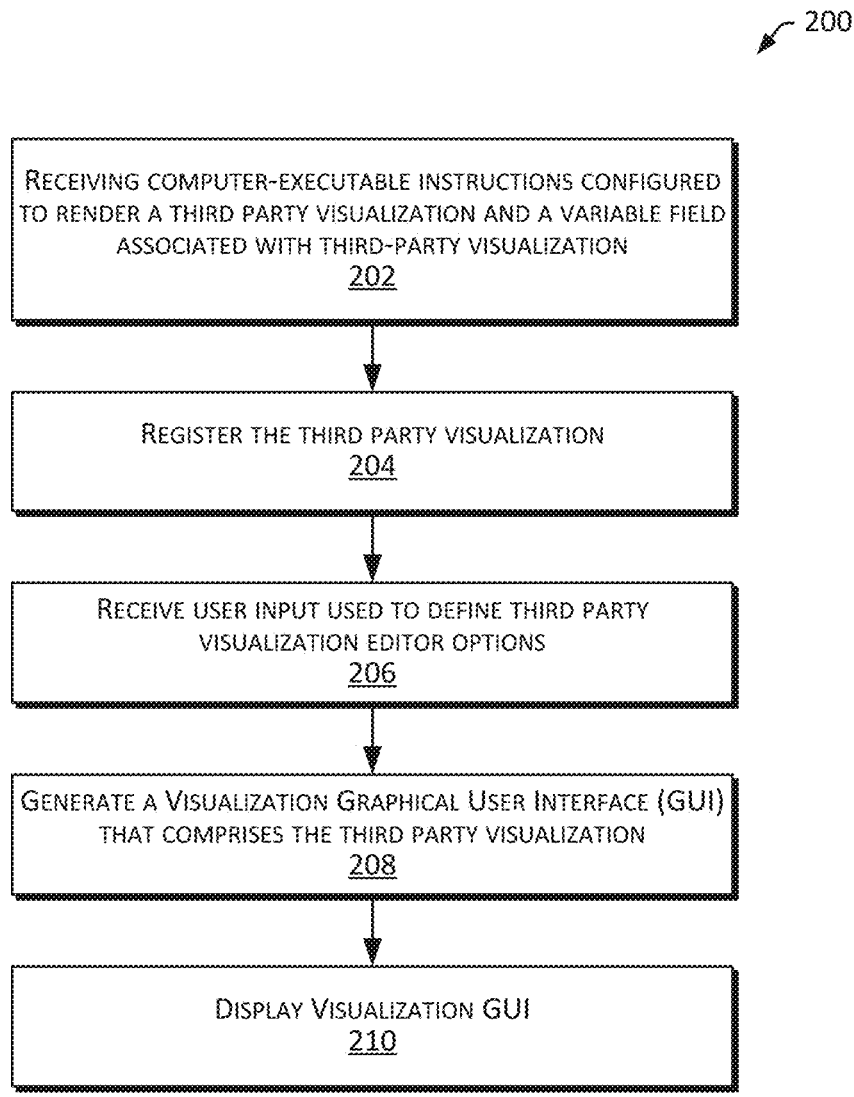
FIG. 2A is a flowchart that illustrates an example method for receiving third party visualizations through an application programming interface (API) in accordance with the disclosed embodiments.
Figure 2B:
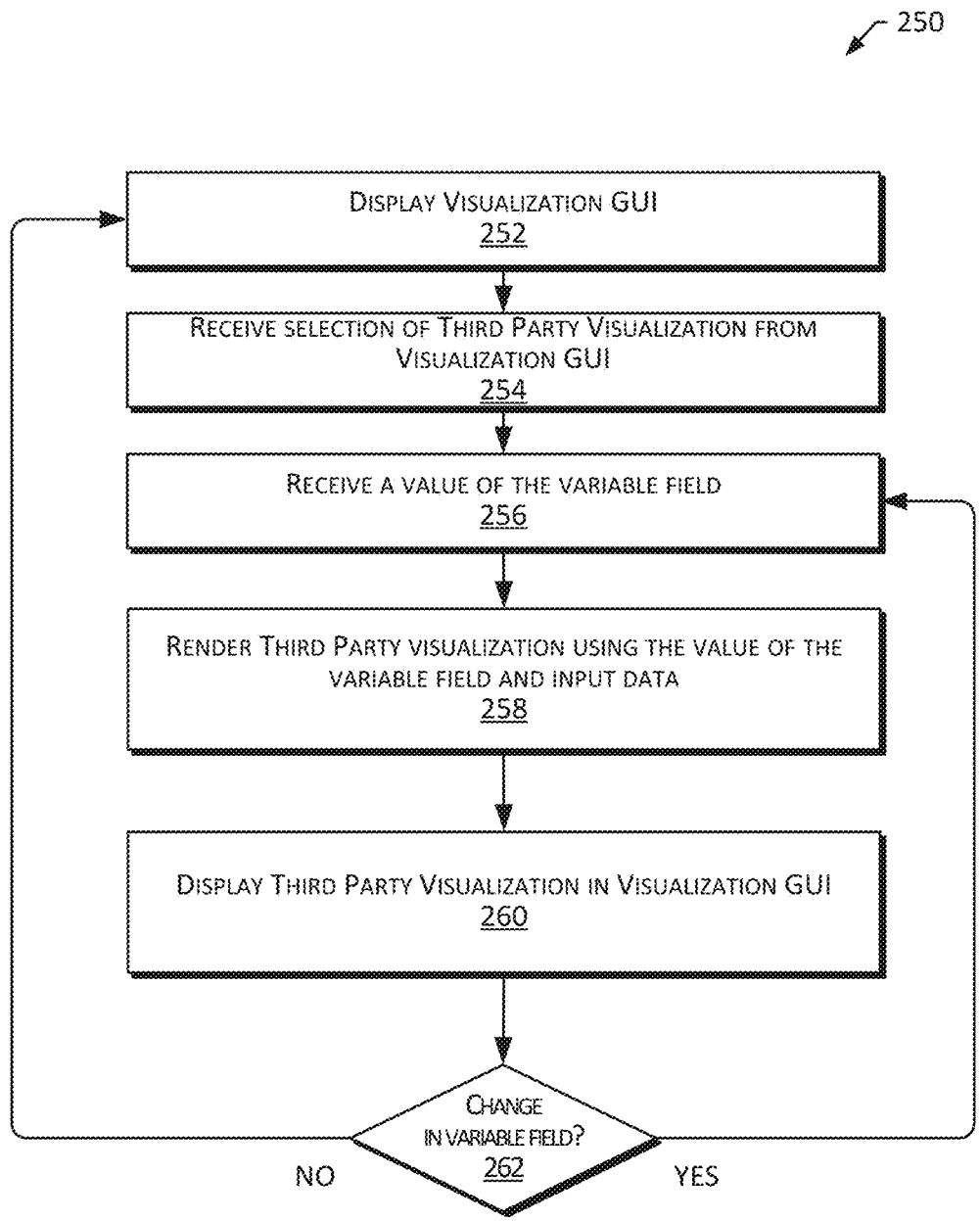
FIG. 2B is a flowchart that illustrates an example method for providing an interactive graphical user interface (GUI) for rendering third party visualizations in accordance with the disclosed embodiments.

FIGS. 2A and 2B are flowcharts that illustrate example methods for providing third party visualizations in accordance with the disclosed embodiments. FIG. 2A is a flowchart that illustrates an example method for receiving third party visualizations through an application programming interface (API) in accordance with the disclosed embodiments. At block 202, the visualization engine 140 may receive computer-executable instructions configured to render a third party visualization. The third party visualization may be rendered based on or using machine-generated data, such as those described herein. The visualization engine 140 may also receive one or more variable fields associated with the third-party visualization. The one or more variable fields can be fields that have values that may be changed or updated by a user 108 via a GUI. A change in the value of the variable field may initiate the third-party visualization to be re-rendered using the machine-generated data as well as the value of the variable field. In some embodiments, the third party visualization may be received through an API. A user 108 may generate computer-executable code that is configured to generate a visualization. The user 108 may submit or otherwise transmit the computer-executable code through the API to the visualization engine 140.

At block 204, the visualization engine 140 may register the third party visualization with the visualization framework of the application program or website. In some embodiments, the visualization engine 140 may receive the computer-executable code through the API with a label to associate with the computer-executable code. The visualization engine 140 may associate the label with the computer-executable code and may add the label to a framework registry. For example, the visualization engine 140 may add indicate that the computer-executable code is a new type of chart and may add a link or location of the computer-executable code to the framework registry. Once the label and associated computer-executable code are added to the framework registry, the new visualization will be available in a menu, such as a drop down menu, on the visualization GUI to be generated and available when on a dashboard of the visualization system.

At block 206, the visualization engine 140 may receive user input for defining third party visualization editor options. For example, the user 108 may be able to customize the look of the GUI elements associated with the visualization. In some embodiments, the user 108 may be able to specify and customize labels that may appear before and/or after the variable field. The user 108 may be able to specify a color scheme to be associated with the menu elements associated with the visualization. In some embodiments, the API may receive the third party visualization editor options. In another embodiment, a GUI of the framework may be used to receive the third party visualization editor options. In some embodiments, receiving visualization editor options may initiate an update to the framework registry. In some embodiments, receiving visualization editor options may initiate creation of a configuration model. A configuration model may be created by the framework and passed to each visualization. The configuration model may be populated with display configuration options that the user 108 has selected, wherein each of the options may initiate respective change events when the user 108 changes those options through the visualization GUI. In some embodiments, the visualization engine 140 may employ an editor schema. The editor schema may be used to define customization controls for user 108 to control the appearance and/or behavior of the visualization. In some embodiments, the editor schema may be JSON-based.

At block 208, the visualization engine 140 may generate a GUI that comprises the third party visualizations. In some embodiments, the GUI may comprise a menu element that displays a plurality of labels corresponding to a respective plurality of visualizations that may be available. In some embodiments, the menu element may be a drop down menu, a menu bar, a scroll menu, or the like. A user 108 may select the third party visualization from the menu element of the GUI. The visualization engine 140 may then render one or more variable elements associated with variable fields of the third party visualization. A user 108 may change a value of the variable field using the associated variable element. In some embodiments, the variable element may be slider, a checkbox, a text field, a drop down menu, a dial element, a spinner, a combination box, or any combination thereof. A user 108 may change the value of the variable field using the variable element. The variable element may initiate a change event to the visualization engine 140. Responsive to the change event, the visualization engine may re-render the visualization using the one or more variable values obtained via the variable elements and input date (e.g., time-stamped machine-generated data). The third party visualization may be displayed via a visualization panel of the GUI.

At block 210, the visualization engine 140 may cause the display of the GUI. In some embodiments, the GUI may be part of a website. In some embodiments, the GUI may be part of an application program, such a mobile device application program or app, or a desktop or computer application program. The visualization engine 140 may display the GUI to a user 108 and may receive input from the user 108 via the GUI. In some embodiments, responsive to the inputs received from the user 108 via the GUI, the visualization engine 140 may update the GUI to depict a re-rendered visualization and/or updates to the variable elements of the GUI.

FIG. 2B is a flowchart that illustrates an example method for providing an interactive graphical user interface (GUI) for rendering third party visualizations in accordance with the disclosed embodiments. At block 252, a the visualization engine 140 may display the visualization GUI (e.g., the visualization GUI generated in FIG. 2A). At block 254, the visualization engine 140 may receive a selection of the third party visualization from the visualization GUI. For example, a user 108 may select the third party visualization from a menu panel of the GUI. The menu panel may include multiple visualizations, both native to the visualization framework and/or received from third parties (e.g., users 108 and/or vendors). The visualizations native to the visualization framework may be displayed with a unique identifier. In some embodiments, the third party visualizations may be displayed with an identifier associated with some or all third party visualizations (e.g., all third party visualizations may have the same icon, such as star). In some embodiments, the third party visualizations may be displayed with an icon provided with the third party visualization. In any instance, the user 108 may select a particular third party visualization by selecting the associated icon, selecting the visualization from a menu panel, or the like. In response to receiving the selection of the visualization, the visualization engine 140 may display one or more variable elements associated with the variable fields of the visualization. Examples of variable elements may include, but are not limited to, a slider, a checkbox, a text field, a drop down menu, a dial element, a spinner, a combination box, or any combination thereof. In some embodiments, the variable elements may be displayed in a panel of the GUI once the third party visualization has been selected by the user 108. In some embodiments, the variable elements may be displayed in a separate display, such as a pop-up window or a different browser window generated by the visualization engine 140.

At block 256, the visualization engine may receive a value of the variable field. In some embodiments, the value of the variable field may be received from one or more variable elements of the GUI (e.g., variable elements from block 254). In some embodiments, the visualization engine 140 may obtain values from the one or more variable elements and may generate a command or query using the values. The command and/or search query may be used to identify input data (e.g., time-stamped machine-generated data) via the back-end search system 120. The visualization engine 140 may transmit the variable value(s), command, and/or search query to the back-end search system 120 which may obtain the input data and transmit the input data back to the visualization engine 140.

At block 258, the visualization engine 140 may render the third party visualization using the value of the variable field and the input data received from one or more back-end search systems 120. In some embodiments, the visualization engine 140 may obtain the input data from the one or more back-end search systems 120 by generating and submitting a search query to the respective back-end search systems 120 using data associated with the visualization and user input received via the GUI associated with the visualization. The input data may be the search results obtained by the back-end search systems 120 using the one or more search queries generated and/or submitted by the visualization engine 140. For example, prior to rendering the visualization, the visualization engine 140 may obtain data associated with the visualization, such as values obtained from users 108 via one or more menu elements (e.g., variable values received from one or more variable elements corresponding to variable fields). The visualization engine 140 may generate one or more search queries to submit to one or more respective back-end search systems 120. In any instance, each back-end search system 120 may obtain search results (e.g., events or time-stamped machine-generated data) that are transmitted to the visualization engine 140. The visualization engine 140 may use the obtained search results to render the visualization.

In some embodiments, the visualization engine 140 may render the visualization using the input data received from the one or more back-end search systems 120. The input data may be obtained by each back-end search system 120 using the one or more variable values obtained from the variable elements. In some embodiments, the visualization engine 140 may apply the one or more variable values to input data that had been previously received from the one or more back-end search systems 120, thus avoiding initiating another search. In some embodiments, the visualizations may be rendered using two or more data sets of machine-generated data and the GUI may be updated to depict the two or more data sets. For example, on a shot chart, as depicted in FIGS. 3A-3D, instead of displaying a visualization for only one user (e.g., Stephen Curry), the visualization may depict multiple players (e.g., Michael Jordan, Lebron James). The depictions may be distinct for each set of data so the user may easily view and understand how the different data sets for each player are different.

At block 260, the visualization engine 140 may display the third party visualization in the visualization GUI. In some embodiments, the computer-executable instructions received via the API may be used to render the visualization, using the input data and one or more variable values obtained from the user 108. The visualization may be rendered by the visualization engine 140 or the visualization engine 140 may instruct another component of the visualization system 102 to render the visualization. The visualization engine 140 may otherwise facilitate the rendering of the visualization using the input data and one or more variable values. The visualization engine 140 may then update the visualization panel of the GUI to display the rendered visualization to the user.

At block 262, the visualization engine 140 may determine whether there has been a change in the variable field. In some embodiments, when a user 108 modifies a variable value in a variable field via one or more variable elements of the visualization GUI, a change event may be generated and fired or transmitted to the visualization engine 140. The change event may be a notification that a change in variable value in a variable field has been detected. The visualization engine 140 may determine whether the variable value has been changed (e.g., comparing a previous variable value to the new variable value). If at block 262, the visualization engine 140 determines there has not been a change in the variable field, then the method may proceed back to block 252. If at block 262, the visualization engine 140 determines that there has been a change in the variable field, then the method may proceed back to block 256.

In some embodiments, the computer-executable instructions that are configured to render the visualization may be packaged so that they can be downloaded onto another device and/or platform for use by another user. In some embodiments, the computer-executable instructions that are configured to render the visualization may be transmitted to another user or otherwise downloaded independent of the application or web browser that will ultimately execute the computer-executable instructions to render the visualization. In some embodiments, a GUI may be updated to comprise the visualization as well as other third party visualizations. For example, multiple third party visualizations may be depicted in a single page.

Figure 3A:
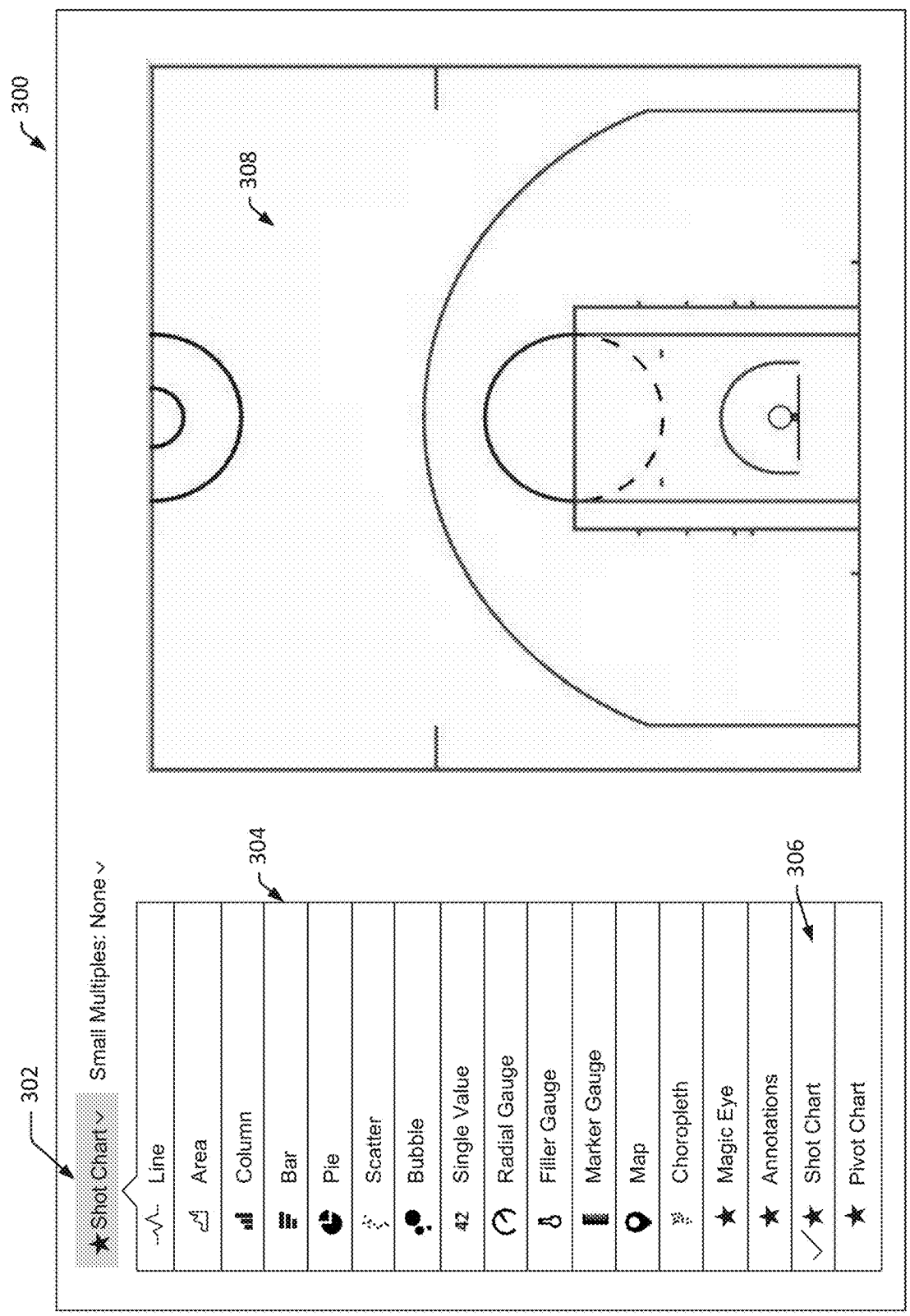
FIGS. 3A-3D are illustrations of example GUIs in accordance with the disclosed embodiments.
Figure 3B:
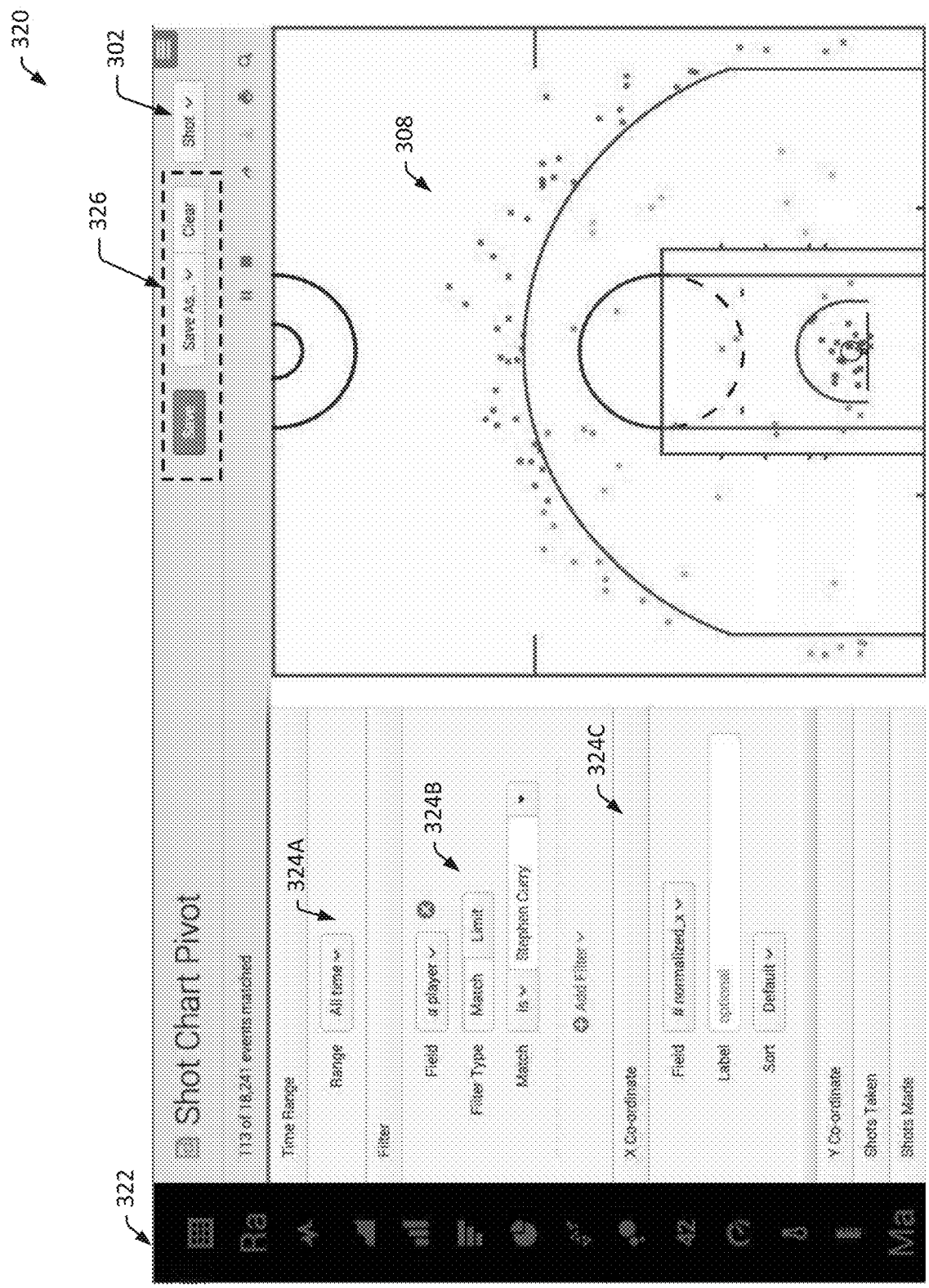

FIGS. 3A-3D are illustrations of example GUIs in accordance with the disclosed embodiments. FIG. 3A is an illustration of an example GUI 300 for providing third party visualization. An application program and/or website that is capable of providing visualizations to a user 108 may generate a GUI that includes multiple elements or components. For example, the visualization in example GUI 300 is a shot chart for basketball. Menu component 302 shown in the GUI 300 can indicate the selected visualization (e.g., shot chart). Drop down menu 304 shown in the GUI 300 can display one or more available visualizations. Each visualization may correspond to a respective menu element and may be represented by an icon and/or a text label. In some embodiments, system and/or native visualizations may have a unique icon associated with each visualization. The third party visualizations that were received from a user 108 (e.g., via an API) may all have the same icon, such as the star icon depicted in the example GUI 300. In some embodiments, a selected visualization 306 may have a visual indicator, such a checkmark, highlight, or the like. Upon selection of a visualization, the corresponding visualization may be rendered (e.g., using machine-generated data) and may be depicted in a visualization panel, such as 308. For example, in the GUI 300, the visualization is that of a basketball court. In some embodiments with a third party visualization, a user 108 may specify one or more variables to depict different data points on the visualization. For example, the user 108 may need to specify one or more variable fields via variable elements, as depicted in FIG. 3B.

FIG. 3B is an illustration of an example GUI 320 that depicts one or more variable elements corresponding to one or more variable fields associated with a third party visualization. The menu component 302 that indicates the selected visualization is again depicted. The GUI for visualizations may have a short cut element 322 that depicts the available visualizations in the form of selectable icons. In some embodiments, the GUI 320 may display one or more variable elements that correspond to variable fields associated with a third party visualization. For example, different variable elements, such as 324A-324F, may be depicted, each of which can correspond to variable fields of the shot chart table. 324A is a time range variable element that is a drop down menu allowing a user 108 to designate a specific time range of data to display in the shot chart visualization. 324B is a variable element that is configured to let a user 108 select different filter options. For example, the user 108, in the depicted example, may designate a filter field of "a player", designate the type of filter (e.g., match), and further designate a specific player (e.g., Stephen Curry). 324C is another variable element corresponding to a variable field that permits a user 108 to designate x-coordinates of data and to optionally add a label in association with the field. Based on the values received in 324A-324C, the visualization may be re-rendered and shown in the visualization panel 308. Additionally, example GUI 320 also depicts a save option 326 to save the different variable values and visualizations rendered by the third party visualization.

Figure 3C:
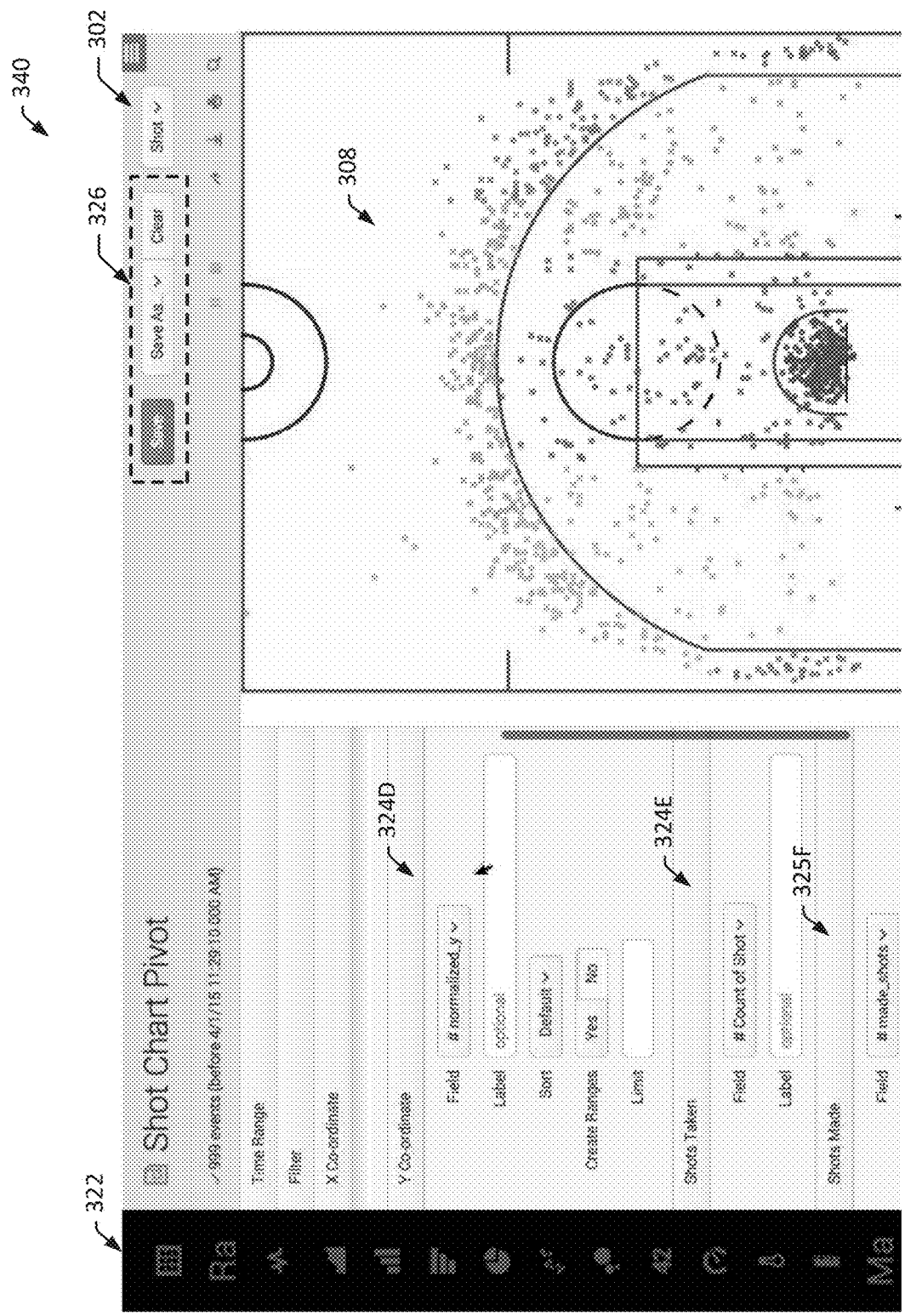

FIG. 3C is an illustration of an example GUI 320 that depicts additional variable elements corresponding to additional variable fields associated with the third party visualization (e.g., shot chart). 324D is a variable element that is associated with obtaining y-coordinates for data to display in the shot chart visualization. 324E is a variable element that is configured to let a user 108 select different values for data indicating shots taken by one or more players in the shots visualization. 324F is another variable element corresponding to a variable field that permits a user 108 to designate different values for data indicating shots made and optionally add a label in association with that field. Based on the values received in 324D-324F, the third party visualization may be re-rendered and shown in the visualization panel 308. Additionally, example GUI 320 also depicts a save option 326 to save the different variable values and visualizations rendered by the third party visualization.

Figure 3D:
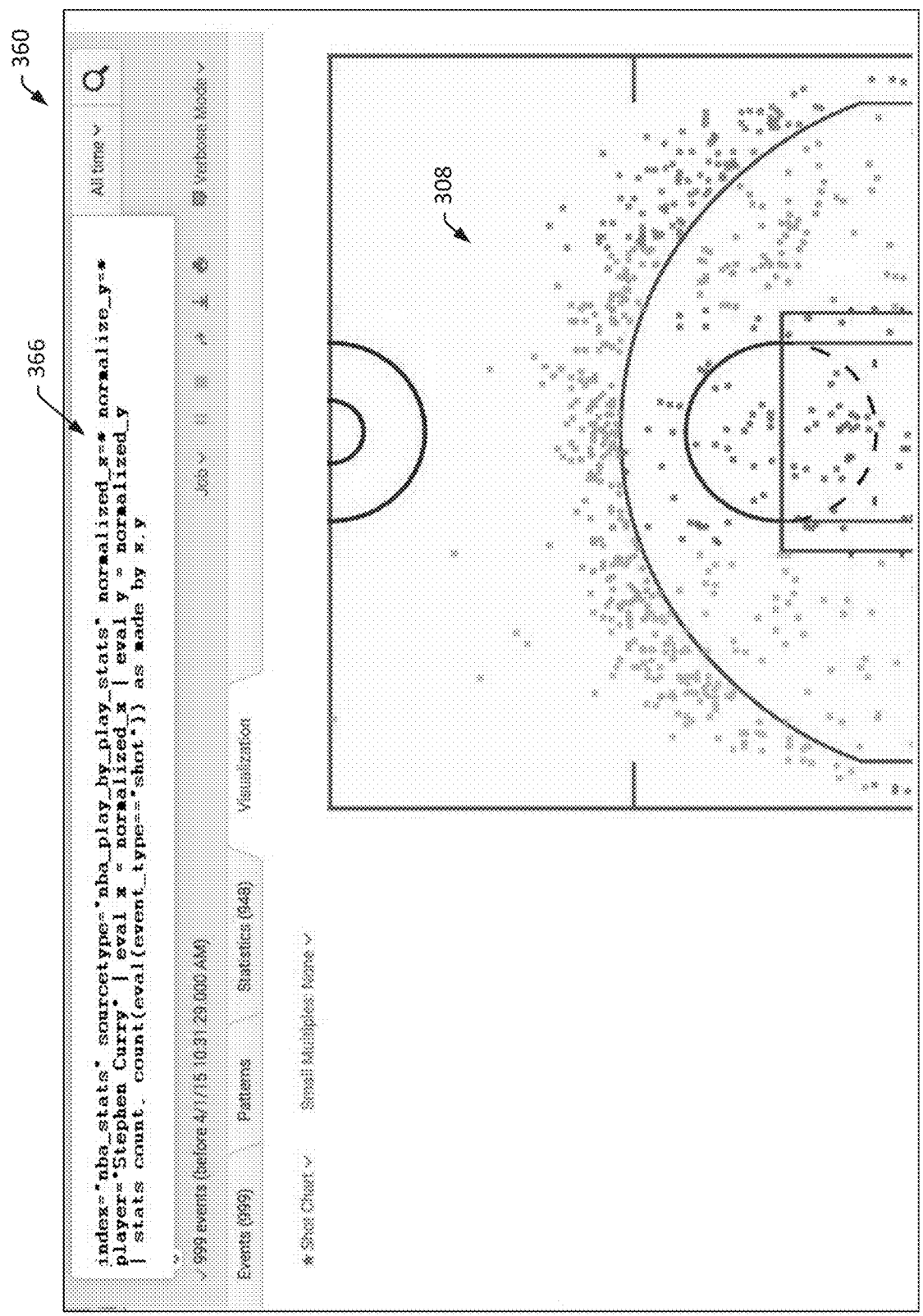

FIG. 3D is an illustration of an example GUI 360 that depicts a third party visualization. In some embodiments, the GUI 360 may comprise a text field 366. The text field 366 may be used to designate or specify values for variable fields without using menu elements. In some embodiments, the text field 366 may be used to designate values for the variable fields but also to specify values to be used to identify or search machine-generated data to be used in rendering the third party visualization. In some embodiments, the text field 366 may be used to generate and submit a search query. In some embodiments, the user may directly input a search query to perform a search of one or more data sources 122 of machine-generated data rather than having the visualization engine 140 generate the query based on information obtained via the GUI. In the text field 366 the user 108 may designate one or more fields and/or attributes to be used in the search query of the machine-generated data. In some embodiments, the search query may include an identification of data sources 122 to use for the query and one or more criteria to use the query. The criteria may include specification of values for one or more fields and/or attributes associated with the visualization. For example, the criteria may be values corresponding to one or more variable values associated with the visualizations that may be depicted in one or more menu elements. The visualization engine 140 may receive the one or more search queries from the user 108 via the text field 366 to submit to a back-end search system 120. The back-end search system 120 may obtain search results (e.g., events or time-stamped machine-generated data) that are transmitted to the visualization engine 140. The visualization engine 140 may use the obtained search results to render the visualization. In some embodiments, the visualization engine 140 may use field values extracted from the events (e.g., machine-generated data associated with timestamps) using one or more extraction rules of a late-binding schema. In some embodiments, the text field 366 may be displayed in the GUI 360 in addition to or in lieu of the variable elements that correspond to variable fields associated with the third party visualization.

In some embodiments, a user 108 may interact with the GUI and associated menu elements to change one or more values (e.g., values of associated variable fields). The visualization engine 140 may use one or more indications received via the GUI to generate and/or modify a search query. The search query may be used to obtain input data (e.g., events of raw machine-generated data) from a backend search system 120. In some embodiments, the user 108 may utilize the GUI and associated menu elements to generate the search query. This enables users 108 who do not have the knowledge to generate a thorough search query to obtain comprehensive input data to generate a visualization without having to explicitly generate a search query. Users 108 who are capable of generating a search query may utilize the text field, as depicted in FIG. 3D to generate and submit a search query without the aid of the menu elements.

Figure 4:
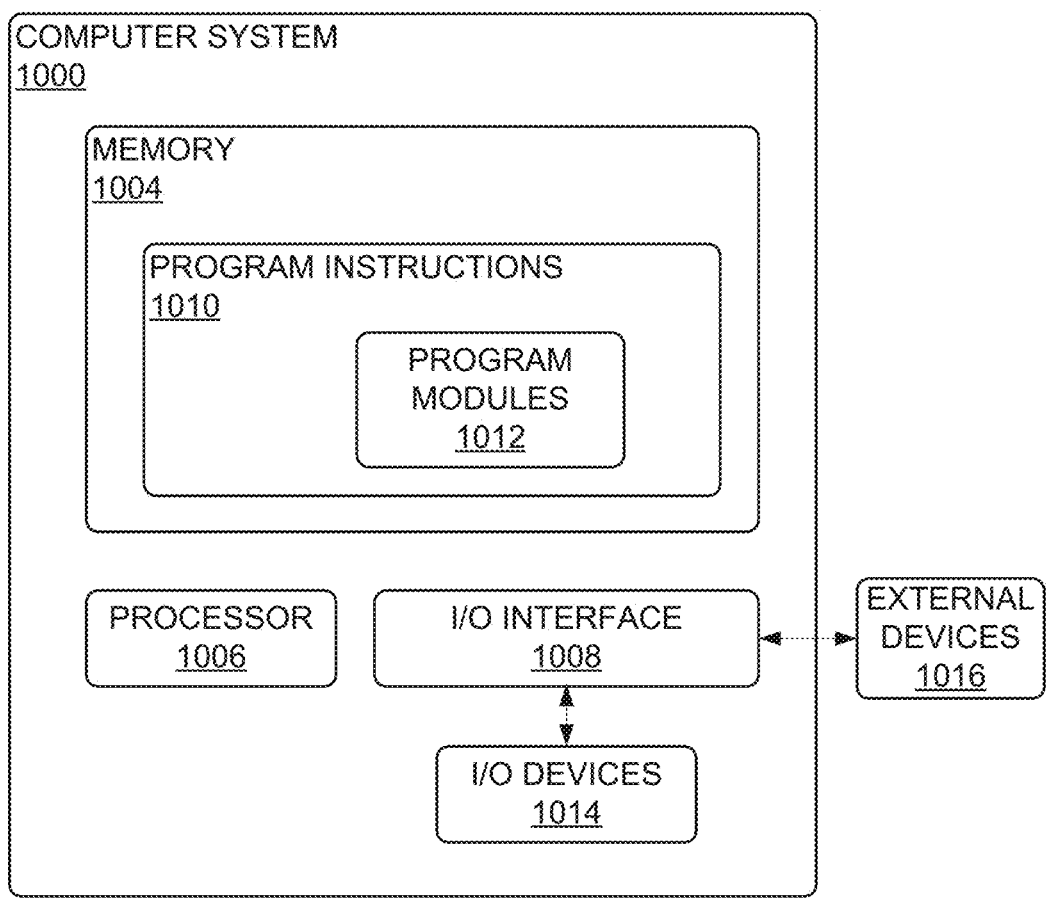
FIG. 4 is a diagram that illustrates an example computer system in accordance with the disclosed embodiments.

FIG. 4 is a diagram that illustrates an example computer system 1000 in accordance with one or more embodiments. In some embodiments, the computer system 1000 may include a memory 1004, a processor 1006, and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), bulk storage memory (e.g., CD-ROM and/or DVD-ROM, hard drives), and/or the like. The memory 1004 may include a non-transitory computer-readable storage medium having program instructions 1010 stored therein. The program instructions 1010 may include program modules 1012 that are executable by a computer processor (e.g., the processor 1006) to cause the functional operations described herein, including, for example, one or more of the methods 200 and/or 250. In the context of a computer system of the client device 106, the program modules 1012 may include one or more modules for performing some or all of the operations described with regard to the client device 106. In the context of a computer system of the application server 110, the program modules 1012 may include a one or more modules (e.g., the enterprise application module 140) for performing some or all of the operations described with regard to the application server 110 and/or the application 140.

The processor 1006 may be any suitable processor capable of executing/performing program instructions. The processor 1006 may include a central processing unit (CPU) that carries out program instructions (e.g., the program instructions of the program module(s) 1012) to perform the arithmetical, logical, and input/output operations described herein. The processor 1006 may include one or more processors. The I/O interface 1008 may provide an interface for communication with one or more I/O devices 1014, such as a joystick, a computer mouse, a keyboard, a display screen (e.g., an electronic display for displaying a graphical user interface (GUI)), and/or the like. The I/O devices 1014 may include one or more of the user input devices. The I/O devices 1014 may be connected to the I/O interface 1008 via a wired or a wireless connection. The I/O interface 1008 may provide an interface for communication with one or more external devices 1016, such as other computers, networks, and/or the like. In some embodiments, the I/O interface 1008 may include an antenna, transceiver, and/or the like.

Accordingly, certain disclosed embodiments are systems and methods for providing third party visualizations. As described herein, in some embodiments, an application program or website may provide different types of visualizations for machine-generated data, for example, via an interactive visualization GUI including an interactive dashboard. Such visualizations may enable a user 108 to easily analyze and understand large quantities of machine-generated data. In some embodiments, the visualizations may be rendered using machine-generated data and searches of the data that employ a late binding schema. For example, the visualizations (e.g., metrics, graphs, and/or the like) may be based on underlying data contained in events of machine-generated data. A visualization may utilize an underlying search of machine-generated data for events generated by servers. Such a search may employ, for example, a late-binding schema to identify one or more event records of a set of indexed event records that each include a portion of machine-generated data and are each time-stamped or otherwise associated with a particular time. At least the following sections describe an example data system that may employ the described embodiments, including employing one or more searches of machine-generated data that can be employed in conjunction with the above described techniques.

1.1 Overview of Example Performance Data System

Modern data centers often comprise thousands of host computer systems that operate collectively to service requests from even larger numbers of remote clients. During operation, these data centers generate significant volumes of performance data and diagnostic information that can be analyzed to quickly diagnose performance problems. In order to reduce the size of this performance data, the data is typically pre-processed prior to being stored based on anticipated data-analysis needs. For example, pre-specified data items can be extracted from the performance data and stored in a database to facilitate efficient retrieval and analysis at search time. However, the rest of the performance data is not saved and is essentially discarded during pre-processing. As storage capacity becomes progressively cheaper and more plentiful, there are fewer incentives to discard this performance data and many reasons to keep it.

This plentiful storage capacity is presently making it feasible to store massive quantities of minimally processed performance data at "ingestion time" for later retrieval and analysis at "search time." Note that performing the analysis operations at search time provides greater flexibility because it enables an analyst to search all of the performance data, instead of searching pre-specified data items that were stored at ingestion time. This enables the analyst to investigate different aspects of the performance data instead of being confined to the pre-specified set of data items that were selected at ingestion time.

However, analyzing massive quantities of heterogeneous performance data at search time can be a challenging task. A data center may generate heterogeneous performance data from thousands of different components, which can collectively generate tremendous volumes of performance data that can be time-consuming to analyze. For example, this performance data can include data from system logs, network packet data, sensor data, and data generated by various applications. Also, the unstructured nature of much of this performance data can pose additional challenges because of the difficulty of applying semantic meaning to unstructured data, and the difficulty of indexing and querying unstructured data using traditional database systems.

These challenges can be addressed by using an event-based system, such as the SPLUNK® ENTERPRISE system produced by Splunk Inc. of San Francisco, Calif., to store and process performance data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK®

ENTERPRISE system is particularly useful for analyzing unstructured performance data, which is commonly found in system log files. Although many of the techniques described herein are explained with reference to the SPLUNK® ENTERPRISE system, the techniques are also applicable to other types of data server systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that can include different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements, and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

1.2 Data Server System

Figure 5:
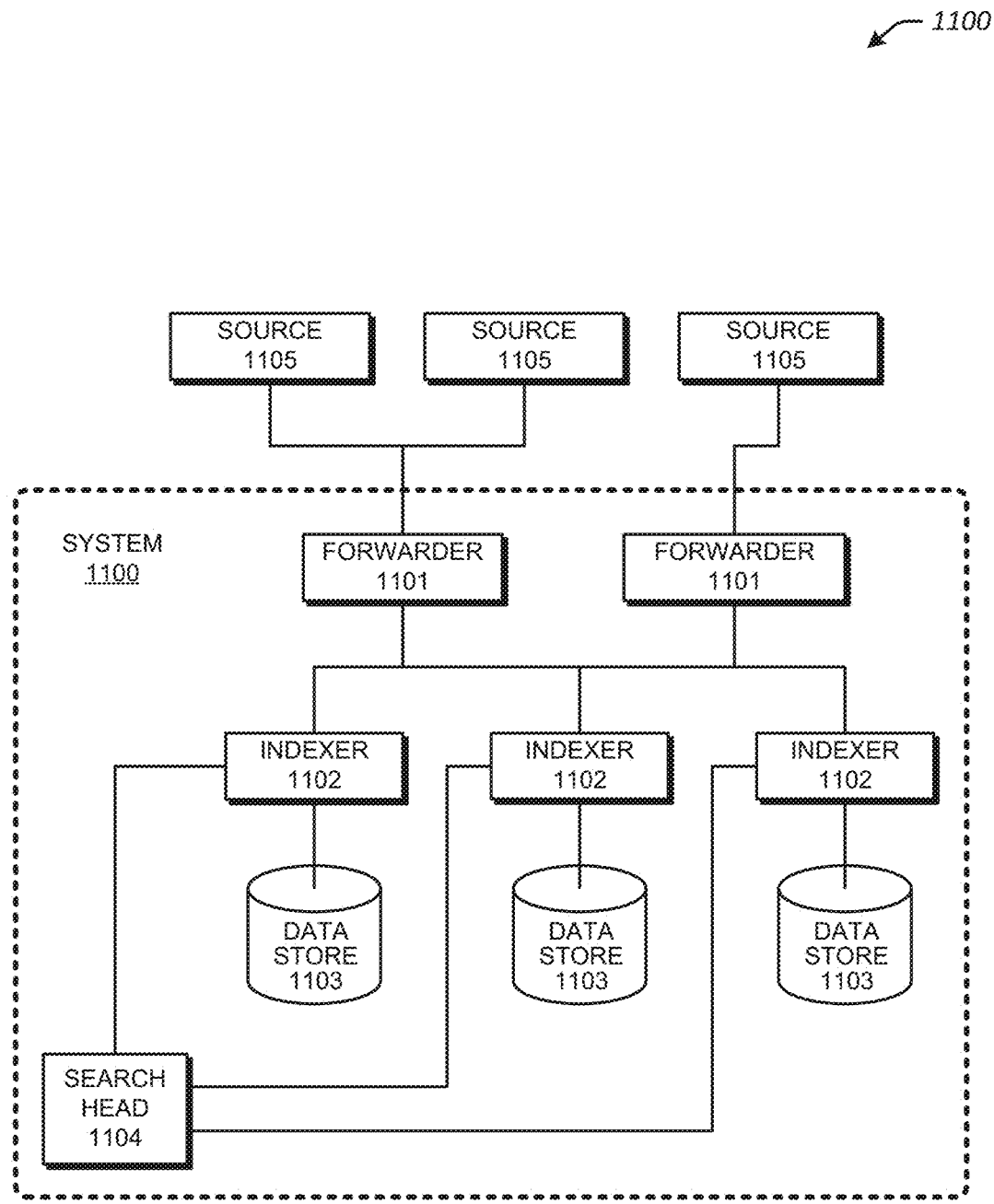
FIG. 5 presents a block diagram of an example event-processing system in accordance with the disclosed embodiments.

FIG. 5 presents a block diagram of an exemplary event-processing system 1100, similar to the SPLUNK® ENTERPRISE system. System 1100 includes one or more forwarders 1101 that collect data obtained from a variety of different data sources 1105, and one or more indexers 1102 that store, process, and/or perform operations on this data, wherein each indexer operates on data contained in a specific data store 1103. These forwarders and indexers can comprise separate computer systems in a data center, or may alternatively comprise separate processes executing on various computer systems in a data center.

During operation, the forwarders 1101 identify which indexers 1102 will receive the collected data and then forward the data to the identified indexers. Forwarders 1101 can also perform operations to strip out extraneous data and detect timestamps in the data. The forwarders 1101 next determine which indexers 1102 will receive each data item and then forward the data items to the determined indexers 1102.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 1100 and the processes described below with respect to FIGS. 5-9 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes.

1.3 Data Ingestion

Figure 6:
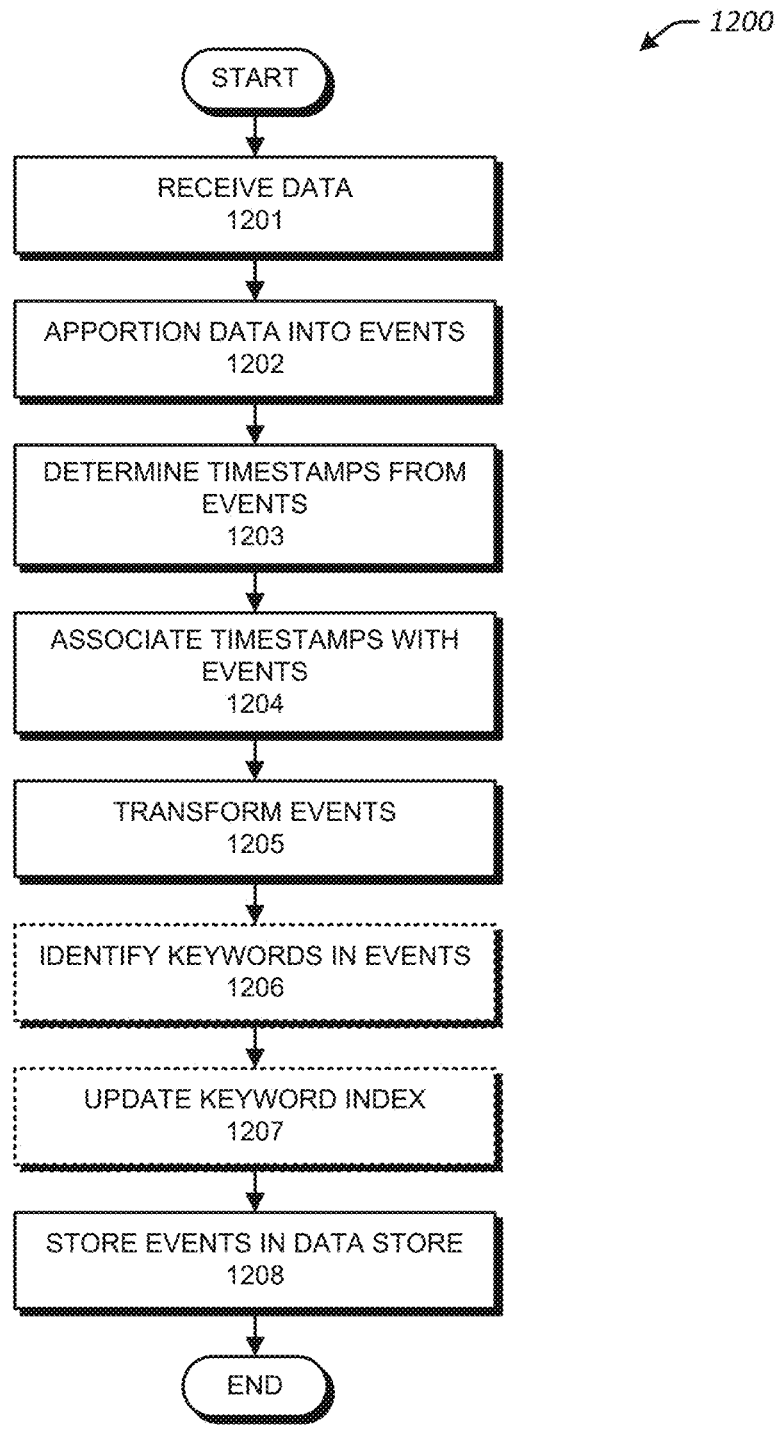
FIG. 6 presents a flowchart illustrating an example of how indexers process, index, and store data received from forwarders in accordance with the disclosed embodiments.

FIG. 6 presents a flowchart illustrating how an indexer processes, indexes, and stores data received from forwarders in accordance with the disclosed embodiments. At block 1201, the indexer receives the data from the forwarder. Next, at block 1202, the indexer apportions the data into events. Note that the data can include lines of text that are separated by carriage returns or line breaks, and an event may include one or more of these lines. During the apportioning process, the indexer can use heuristic rules to automatically determine the boundaries of the events, which for example coincide with line boundaries. These heuristic rules may be determined based on the source of the data, wherein the indexer can be explicitly informed about the source of the data or can infer the source of the data by examining the data. These heuristic rules can include regular expression-based rules or delimiter-based rules for determining event boundaries, wherein the event boundaries may be indicated by predefined characters or character strings. These predefined characters may include punctuation marks or other special characters including, for example, carriage returns, tabs, spaces, or line breaks. In some cases, a user can fine-tune or configure the rules that the indexers use to determine event boundaries in order to adapt the rules to the user's specific requirements.

Next, the indexer determines a timestamp for each event at block 1203. As mentioned above, these timestamps can be determined by extracting the time directly from the data in the event, or by interpolating the time based on timestamps from temporally proximate events. In some cases, a timestamp can be determined based on the time the data was received or generated. The indexer subsequently associates the determined timestamp with each event at block 1204, for example, by storing the timestamp as metadata for each event.

Then, the system can apply transformations to data to be included in events at block 1205. For log data, such transformations can include removing a portion of an event (e.g., a portion used to define event boundaries, extraneous text, characters, etc.) or removing redundant portions of an event. Note that a user can specify portions to be removed using a regular expression or any other possible technique.

Next, a keyword index can optionally be generated to facilitate fast keyword searching for events. To build a keyword index, the indexer first identifies a set of keywords in events in block 1206. Then, at block 1207 the indexer includes the identified keywords in an index, which associates each stored keyword with references to events containing that keyword (or to locations within events where that keyword is located). When an indexer subsequently receives a keyword-based query, the indexer can access the keyword index to quickly identify events containing the keyword.

In some embodiments, the keyword index may include entries for name-value pairs found in events, wherein a name-value pair can include a pair of keywords connected by a symbol, such as an equals sign or a colon. In this way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2."

Finally, the indexer stores the events in a data store at block 1208, wherein a timestamp can be stored with each event to facilitate searching for events based on a time range. In some cases, the stored events are organized into a plurality of buckets, wherein each bucket stores events associated with a specific time range. This not only improves time-based searches, but it also allows events with recent timestamps that may have a higher likelihood of being accessed to be stored in faster memory to facilitate faster retrieval. For example, a bucket containing the most recent events can be stored as flash memory instead of on hard disk.

Each indexer 1102 is responsible for storing and searching a subset of the events contained in a corresponding data store 1103. By distributing events among the indexers and data stores, the indexers can analyze events for a query in parallel, for example, using map-reduce techniques, wherein each indexer returns partial responses for a subset of events to a search head that combines the results to produce an answer for the query. By storing events in buckets for specific time ranges, an indexer may further optimize searching by looking only in buckets for time ranges that are relevant to a query.

Moreover, events and buckets can also be replicated across different indexers and data stores to facilitate high availability and disaster recovery as is described in U.S. patent application Ser. No. 14/266,812, filed on Apr. 30 2014, and in U.S. application patent Ser. No. 14/266,817, also filed on Apr. 30, 2014, which are hereby incorporated by reference.

1.4 Query Processing

Figure 7:
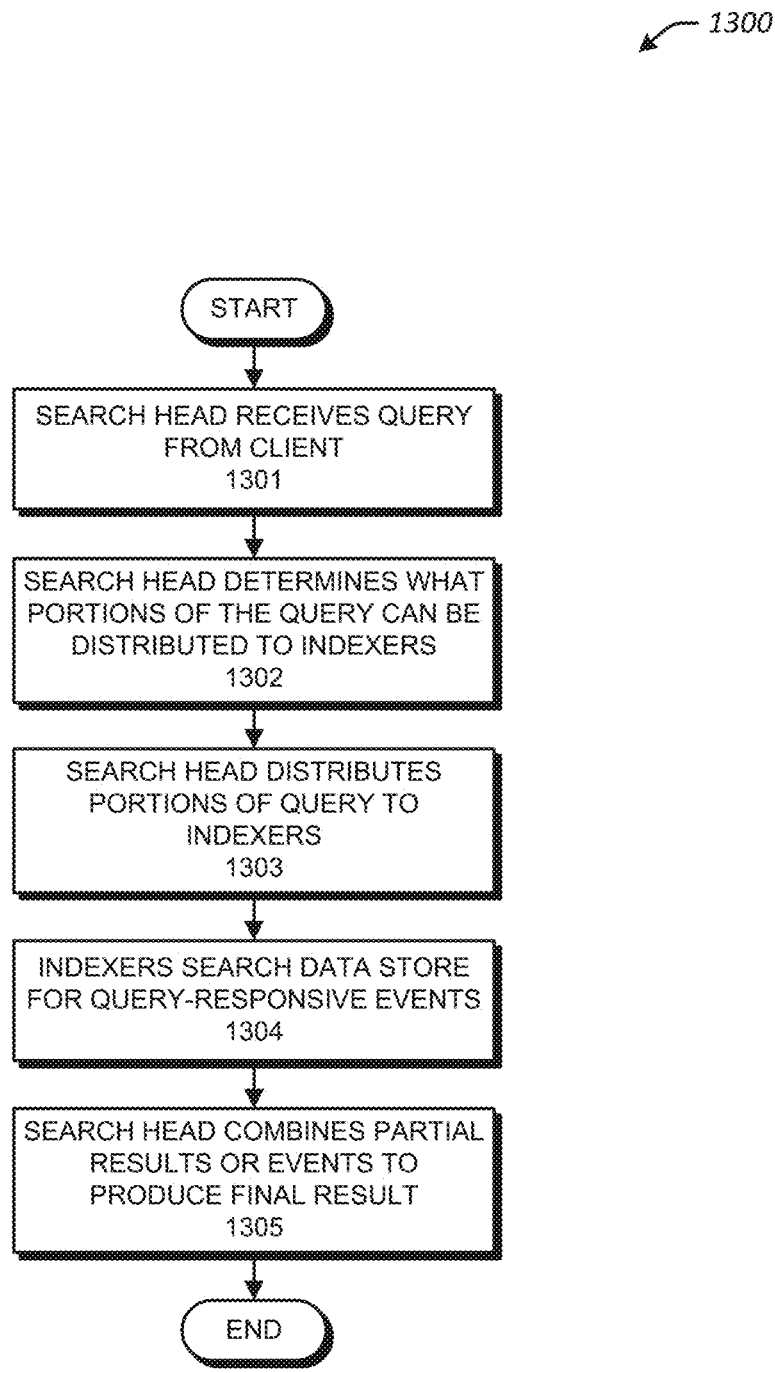
FIG. 7 presents a flowchart illustrating an example of how a search head and indexers perform a search query in accordance with the disclosed embodiments.

FIG. 7 presents a flowchart illustrating how a search head and indexers perform a search query in accordance with the disclosed embodiments. At the start of this process, a search head receives a search query from a client at block 1301. Next, at block 1302, the search head analyzes the search query to determine what portions can be delegated to indexers and what portions need to be executed locally by the search head. At block 1303, the search head distributes the determined portions of the query to the indexers. Note that commands that operate on single events can be trivially delegated to the indexers, while commands that involve events from multiple indexers are harder to delegate.

Then, at block 1304, the indexers to which the query was distributed search their data stores for events that are responsive to the query. To determine which events are responsive to the query, the indexer searches for events that match the criteria specified in the query. This criteria can include matching keywords or specific values for certain fields. In a query that uses a late-binding schema, the searching operations in block 1304 may involve using the late-binding scheme to extract values for specified fields from events at the time the query is processed. Next, the indexers can either send the relevant events back to the search head, or use the events to calculate a partial result, and send the partial result back to the search head.

Finally, at block 1305, the search head combines the partial results and/or events received from the indexers to produce a final result for the query. This final result can comprise different types of data depending upon what the query is asking for. For example, the final results can include a listing of matching events returned by the query, or some type of visualization of data from the returned events. In another example, the final result can include one or more calculated values derived from the matching events.

Moreover, the results generated by the system 1100 can be returned to a client using different techniques. For example, one technique streams results back to a client in real-time as they are identified. Another technique waits to report results to the client until a complete set of results is ready to return to the client. Yet another technique streams interim results back to the client in real-time until a complete set of results is ready, and then returns the complete set of results to the client. In another technique, certain results are stored as "search jobs," and the client may subsequently retrieve the results by referencing the search jobs.

The search head can also perform various operations to make the search more efficient. For example, before the search head starts executing a query, the search head can determine a time range for the query and a set of common keywords that all matching events must include. Next, the search head can use these settings to query the indexers to obtain a superset of the eventual results. Then, during a filtering stage, the search head can perform field-extraction operations on the superset to produce a reduced set of search results.

1.5 Field Extraction

Figure 8:
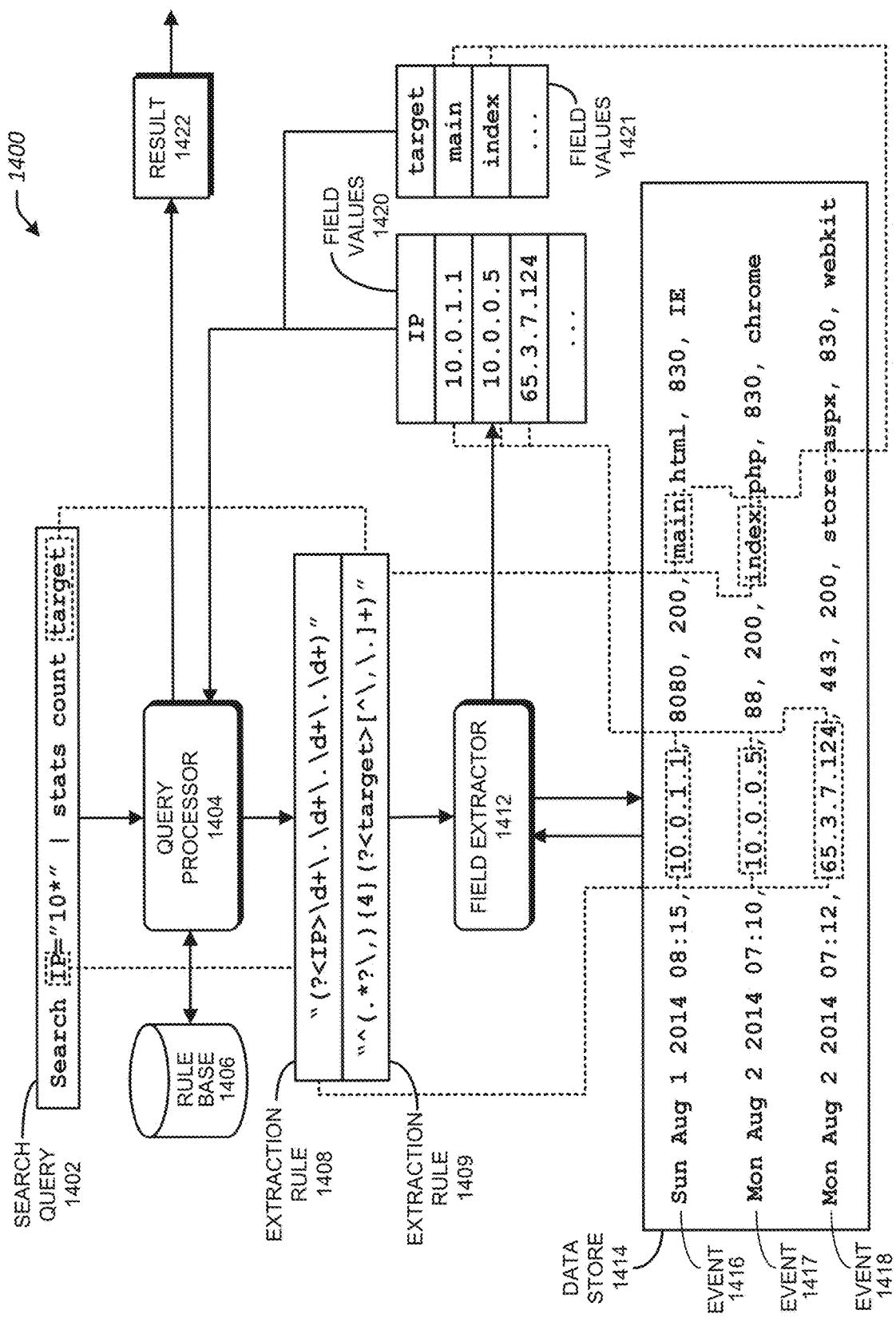
FIG. 8 presents a block diagram of an example system for processing search requests that uses extraction rules for field values in accordance with the disclosed embodiments.

FIG. 8 presents a block diagram illustrating how fields can be extracted during query processing in accordance with the disclosed embodiments. At the start of this process, a search query 1402 is received at a query processor 1404. Query processor 1404 includes various mechanisms for processing a query, wherein these mechanisms can reside in a search head 1104 and/or an indexer 1102. Note that the exemplary search query 1402 illustrated in FIG. 8 is expressed in Search Processing Language (SPL), which is used in conjunction with the SPLUNK® ENTERPRISE system. SPL is a pipelined search language in which a set of inputs is operated on by a first command in a command line, and then a subsequent command following the pipe symbol "|" operates on the results produced by the first command, and so on for additional commands. Search query 1402 can also be expressed in other query languages, such as the Structured Query Language (SQL) or any suitable query language.

Upon receiving search query 1402, query processor 1404 sees that search query 1402 includes two fields "IP" and "target." Query processor 1404 also determines that the values for the "IP" and "target" fields have not already been extracted from events in data store 1414, and consequently determines that query processor 1404 needs to use extraction rules to extract values for the fields. Hence, query processor 1404 performs a lookup for the extraction rules in a rule base 1406, wherein the rule base 1406 maps field names to corresponding extraction rules and obtains extraction rules 1408-1409, wherein extraction rule 1408 specifies how to extract a value for the "IP" field from an event, and extraction rule 1409 specifies how to extract a value for the "target" field from an event. As is illustrated in FIG. 8, extraction rules 1408-1409 can comprise regular expressions that specify how to extract values for the relevant fields. Such regular-expression-based extraction rules are also referred to as "regex rules." In addition to specifying how to extract field values, the extraction rules may also include instructions for deriving a field value by performing a function on a character string or a value retrieved by the extraction rule. For example, a transformation rule may truncate a character string, or convert the character string into a different data format. In some cases, the query itself can specify one or more extraction rules.

Next, query processor 1404 sends extraction rules 1408-1409 to a field extractor 1412, which applies extraction rules 1408-1409 to events 1416-1418 in a data store 1414. Note that data store 1414 can include one or more data stores, and extraction rules 1408-1409 can be applied to large numbers of events in data store 1414, and are not meant to be limited to the three events 1416-1418 illustrated in FIG. 8. Moreover, the query processor 1404 can instruct field extractor 1412 to apply the extraction rules to all of the events in a data store 1414, or to a subset of the events that have been filtered based on some criteria.

Next, field extractor 1412 applies extraction rule 1408 for the first command "Search IP="10*"" to events in data store 1414 including events 1416-1418. Extraction rule 1408 is used to extract values for the IP address field from events in data store 1414 by looking for a pattern of one or more digits, followed by a period, followed again by one or more digits, followed by another period, followed again by one or more digits, followed by another period, and followed again by one or more digits. Next, field extractor 1412 returns field values 1420 to query processor 1404, which uses the criterion IP="10*" to look for IP addresses that start with "10". Note that events 1416 and 1417 match this criterion, but event 1418 does not, so the result set for the first command is events 1416-1417.

Query processor 1404 then sends events 1416-1417 to the next command "stats count target." To process this command, query processor 1404 causes field extractor 1412 to apply extraction rule 1409 to events 1416-1417. Extraction rule 1409 is used to extract values for the target field for events 1416-1417 by skipping the first four commas in events 1416-1417, and then extracting all of the following characters until a comma or period is reached. Next, field extractor 1412 returns field values 1421 to query processor 1404, which executes the command "stats count target" to count the number of unique values contained in the target fields, which in this example produces the value "2" that is returned as a final result 1422 for the query.

Note that the query results can be returned to a client, a search head, or any other system component for further processing. In general, query results may include: a set of one or more events; a set of one or more values obtained from the events; a subset of the values; statistics calculated based on the values; a report containing the values; or a visualization, such as a graph or a chart, generated from the values.

1.6 Exemplary Search Screen

Figure 10A:
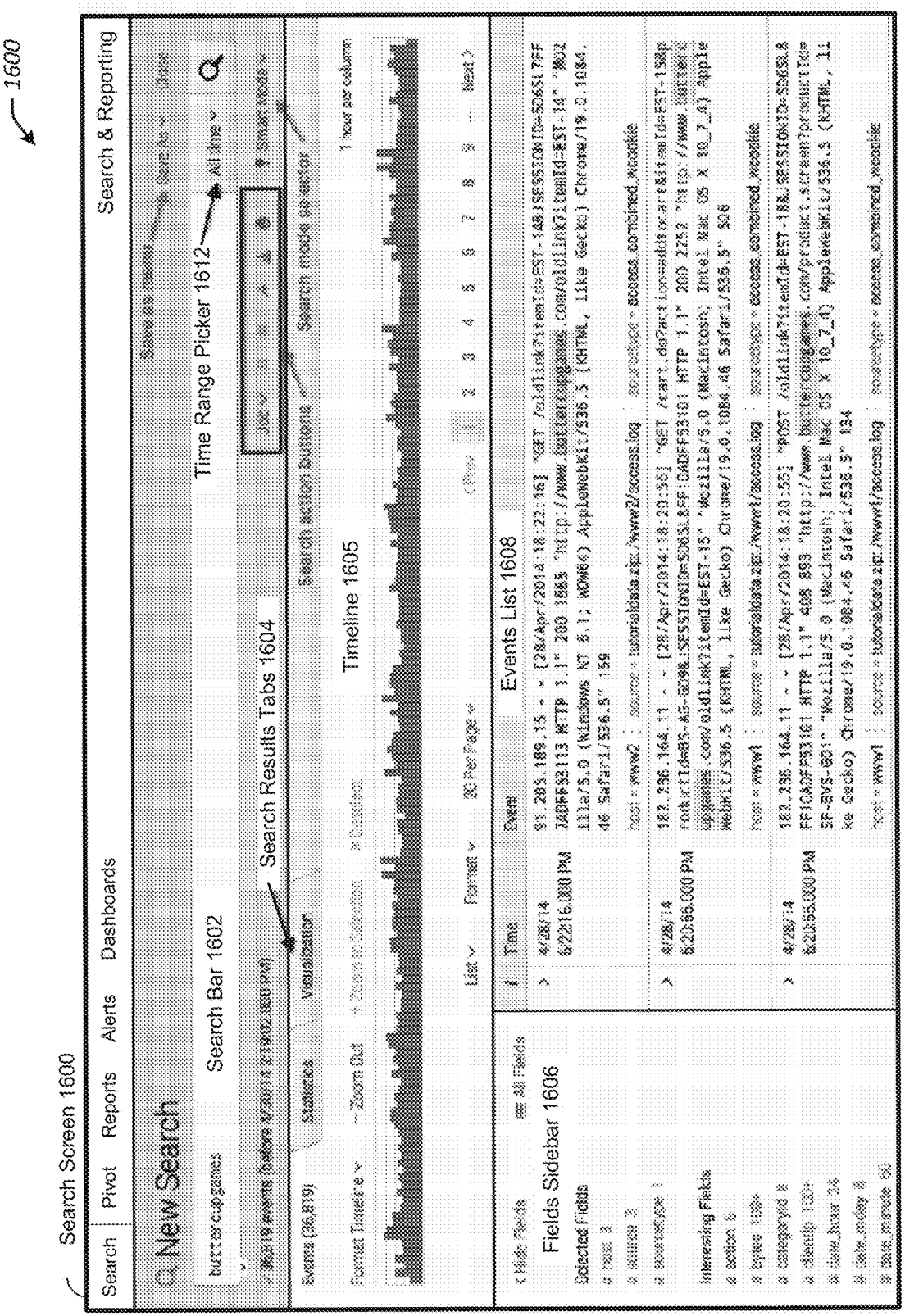
FIG. 10A illustrates an example search screen in accordance with the disclosed embodiments.

FIG. 10A illustrates an exemplary search screen 1600 in accordance with the disclosed embodiments. Search screen 1600 includes a search bar 1602 that accepts user input in the form of a search string. It also includes a time range picker 1612 that enables the user to specify a time range for the search. For "historical searches," the user can select a specific time range, or alternatively a relative time range, such as "today," "yesterday," or "last week." For "real-time searches," the user can select the size of a preceding time window to search for real-time events. Search screen 1600 also initially displays a "data summary" dialog as is illustrated in FIG. 10B that enables the user to select different sources for the event data, for example, by selecting specific hosts and log files.

After the search is executed, the search screen 1600 can display the results through search results tabs 1604, wherein search results tabs 1604 include: an "events tab" that displays various information about events returned by the search; a "statistics tab" that displays statistics about the search results; and a "visualization tab" that displays various visualizations of the search results. The events tab illustrated in FIG. 10A displays a timeline graph 1605 that graphically illustrates the number of events that occurred in one-hour intervals over the selected time range. It also displays an events list 1608 that enables a user to view the raw data in each of the returned events. It additionally displays a fields sidebar 1606 that includes statistics about occurrences of specific fields in the returned events, including "selected fields" that are pre-selected by the user, and "interesting fields" that are automatically selected by the system based on pre-specified criteria.

1.7 Acceleration Techniques

The above-described system provides significant flexibility by enabling a user to analyze massive quantities of minimally processed performance data "on the fly" at search time instead of storing pre-specified portions of the performance data in a database at ingestion time. This flexibility enables a user to see correlations in the performance data and perform subsequent queries to examine interesting aspects of the performance data that may not have been apparent at ingestion time.

However, performing extraction and analysis operations at search time can involve a large amount of data and require a large number of computational operations, which can cause considerable delays while processing the queries. Fortunately, a number of acceleration techniques have been developed to speed up analysis operations performed at search time. These techniques include: (1) performing search operations in parallel by formulating a search as a map-reduce computation; (2) using a keyword index; (3) using a high performance analytics store; and (4) accelerating the process of generating reports. These techniques are described in more detail below.

1.7.1 Map-Reduce Technique

To facilitate faster query processing, a query can be structured as a map-reduce computation, wherein the "map" operations are delegated to the indexers, while the corresponding "reduce" operations are performed locally at the search head. For example, FIG. 9 illustrates how a search query 1501 received from a client at search head 1104 can split into two phases, including: (1) a "map phase" comprising subtasks 1502 (e.g., data retrieval or simple filtering) that may be performed in parallel and are "mapped" to indexers 1102 for execution, and (2) a "reduce phase" comprising a merging operation 1503 to be executed by the search head when the results are ultimately collected from the indexers.

During operation, upon receiving search query 1501, search head 1104 modifies search query 1501 by substituting "stats" with "prestats" to produce search query 1502, and then distributes search query 1502 to one or more distributed indexers, which are also referred to as "search peers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as is illustrated in FIG. 5, or may alternatively distribute a modified version (e.g., a more restricted version) of the search query to the search peers. In this example, the indexers are responsible for producing the results and sending them to the search head. After the indexers return the results to the search head, the search head performs the merging operations 1503 on the results. Note that by executing the computation in this way, the system effectively distributes the computational operations while minimizing data transfers.

1.7.2 Keyword Index

As described above with reference to the flowcharts in FIGS. 6 and 7, the event-processing system 1100 can construct and maintain one or more keyword indices to facilitate rapidly identifying events containing specific keywords. This can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

1.7.3 High Performance Analytics Store

To speed up certain types of queries, some embodiments of the system 1100 make use of a high performance analytics store, which is referred to as a "summarization table," that contains entries for specific field-value pairs. Each of these entries keeps track of instances of a specific value in a specific field in the event data and includes references to events containing the specific value in the specific field. For example, an exemplary entry in a summarization table can keep track of occurrences of the value "94107" in a "ZIP code" field of a set of events, wherein the entry includes references to all of the events that contain the value "94107" in the ZIP code field. This enables the system to quickly process queries that seek to determine how many events have a particular value for a particular field, because the system can examine the entry in the summarization table to count instances of the specific value in the field without having to go through the individual events or do extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range, wherein a bucket-specific summarization table includes entries for specific field-value combinations that occur in events in the specific bucket. Alternatively, the system can maintain a separate summarization table for each indexer, wherein the indexer-specific summarization table only includes entries for the events in a data store that is managed by the specific indexer.

The summarization table can be populated by running a "collection query" that scans a set of events to find instances of a specific field-value combination, or alternatively instances of all field-value combinations for a specific field. A collection query can be initiated by a user, or can be scheduled to occur automatically at specific time intervals. A collection query can also be automatically launched in response to a query that asks for a specific field-value combination.

In some cases, the summarization tables may not cover all of the events that are relevant to a query. In this case, the system can use the summarization tables to obtain partial results for the events that are covered by summarization tables, but may also have to search through other events that are not covered by the summarization tables to produce additional results. These additional results can then be combined with the partial results to produce a final set of results for the query. This summarization table and associated techniques are described in more detail in U.S. Pat. No. 8,682,925, issued on Mar. 25, 2014, which is hereby incorporated by reference.

1.7.4 Accelerating Report Generation

In some embodiments, a data server system such as the SPLUNK® ENTERPRISE system can accelerate the process of periodically generating updated reports based on query results. To accelerate this process, a summarization engine automatically examines the query to determine whether the generation of updated reports can be accelerated by creating intermediate summaries. (This is possible if results from preceding time periods can be computed separately and combined to generate an updated report. In some cases, it is not possible to combine such incremental results, for example, where a value in the report depends on relationships between events from different time periods.) If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that matches the specified criteria.

In parallel with the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on this additional event data. Then, the results returned by this query on the additional event data, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so only the newer event data needs to be processed while generating an updated report. These report acceleration techniques are described in more detail in U.S. Pat. No. 8,589,403, issued on Nov. 19, 2013, and U.S. Pat. No. 8,412,696, issued on Apr. 2, 2011, which are hereby incorporated by reference.

1.8 Security Features

The SPLUNK® ENTERPRISE platform provides various schemas, dashboards, and visualizations that make it easy for developers to create applications to provide additional capabilities. One such application is the SPLUNK® APP FOR ENTERPRISE SECURITY, which performs monitoring and alerting operations and includes analytics to facilitate identifying both known and unknown security threats based on large volumes of data stored by the SPLUNK® ENTERPRISE system. This differs significantly from conventional Security Information and Event Management (STEM) systems that lack the infrastructure to effectively store and analyze large volumes of security-related event data. Traditional STEM systems typically use fixed schemas to extract data from pre-defined security-related fields at data ingestion time, wherein the extracted data is typically stored in a relational database. This data extraction process (and associated reduction in data size) that occurs at data ingestion time inevitably hampers future incident investigations, when all of the original data may be needed to determine the root cause of a security issue, or to detect the tiny fingerprints of an impending security threat.

In contrast, the SPLUNK® APP FOR ENTERPRISE SECURITY system stores large volumes of minimally processed security-related data at ingestion time for later retrieval and analysis at search time when a live security threat is being investigated. To facilitate this data retrieval process, the SPLUNK® APP FOR ENTERPRISE SECURITY provides pre-specified schemas for extracting relevant values from the different types of security-related event data, and also enables a user to define such schemas.

The SPLUNK® APP FOR ENTERPRISE SECURITY can process many types of security-related information. In general, this security-related information can include any information that can be used to identify security threats. For example, the security-related information can include network-related information, such as IP addresses, domain names, asset identifiers, network traffic volumes, uniform resource locator strings, and source addresses. The process of detecting security threats for network-related information is further described in U.S. patent application Ser. Nos. 13/956,252, and 13/956,262, which are hereby incorporated by reference. Security-related information can also include endpoint information, such as malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the SPLUNK® APP FOR ENTERPRISE SECURITY facilitates detecting so-called "notable events" that are likely to indicate a security threat. These notable events can be detected in a number of ways: (1) an analyst can notice a correlation in the data and can manually identify a corresponding group of one or more events as "notable;" or (2) an analyst can define a "correlation search" specifying criteria for a notable event, and every time one or more events satisfy the criteria, the application can indicate that the one or more events are notable. An analyst can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 11A:
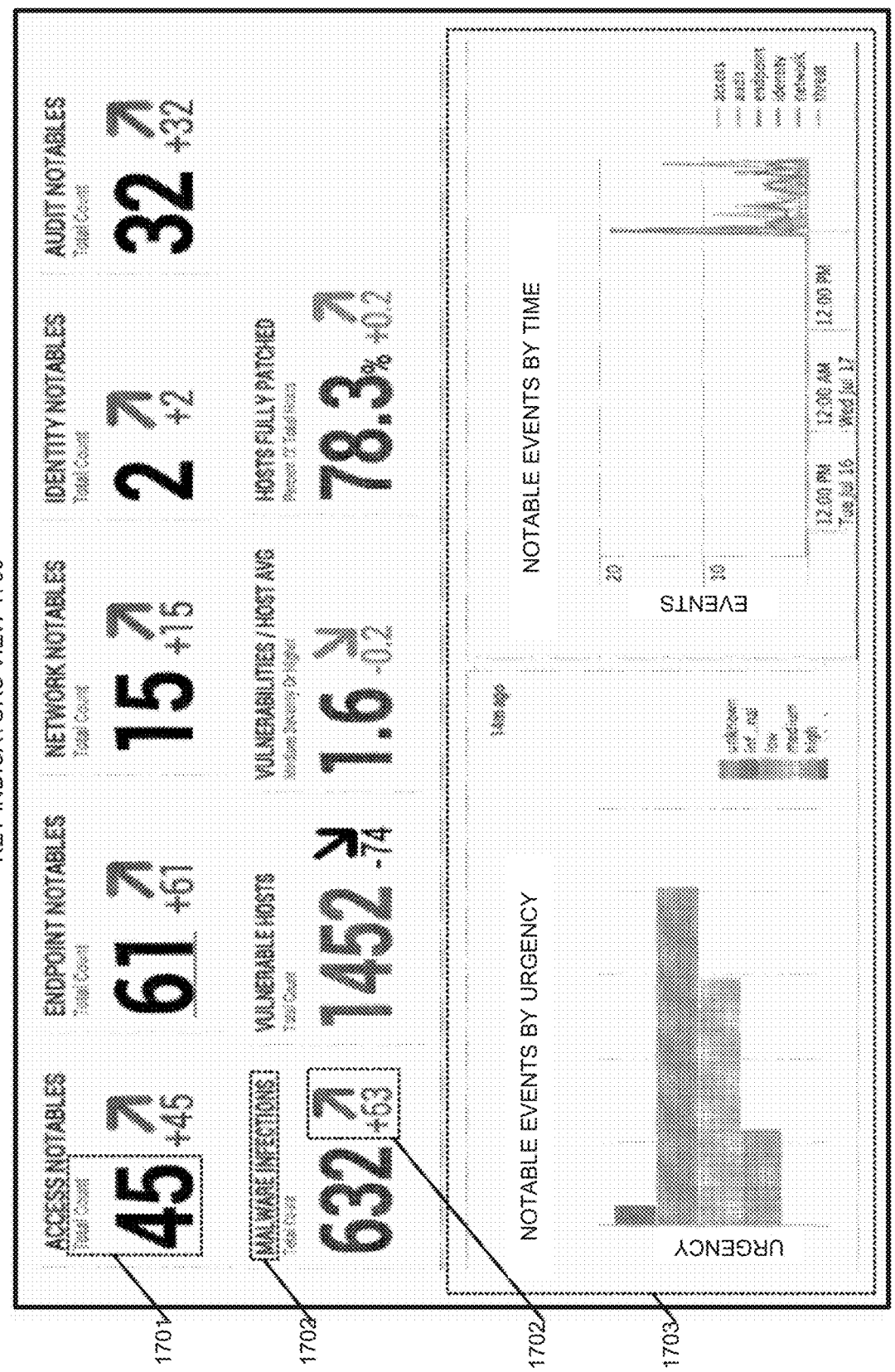
FIG. 11A illustrates an example key indicators view in accordance with the disclosed embodiments.

The SPLUNK® APP FOR ENTERPRISE SECURITY provides various visualizations to aid in discovering security threats, such as a "key indicators view" that enables a user to view security metrics of interest, such as counts of different types of notable events. For example, FIG. 11A illustrates an exemplary key indicators view 1700 that comprises a dashboard, which can display a value 1701, for various security-related metrics, such as malware infections

1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338, filed Jul. 31, 2013, which is hereby incorporated by reference.

Figure 11B:
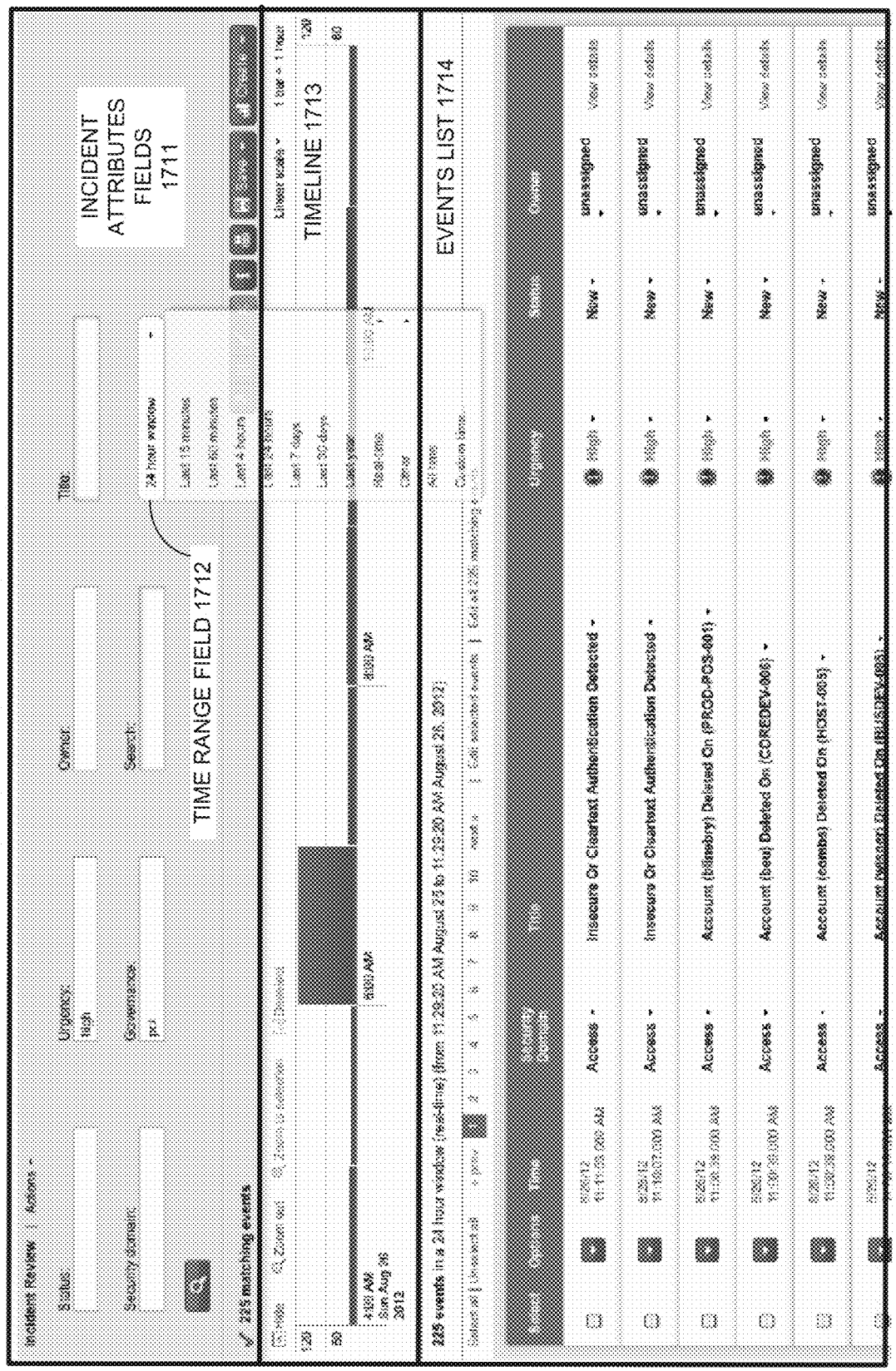
FIG. 11B illustrates an example incident review dashboard in accordance with the disclosed embodiments.

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 11B illustrates an exemplary incident review dashboard 1710 that includes a set of incident attribute fields 1711 that, for example, enables a user to specify a time range field 1712 for the displayed events. It also includes a timeline 1713 that graphically illustrates the number of incidents that occurred in one-hour time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event. The incident review dashboard is described further in "http://docs.splunk.com/Documentation/PCI/21.1/User/IncidentReviewdashboard."

1.9 Data Center Monitoring

As mentioned above, the SPLUNK® ENTERPRISE platform provides various features that make it easy for developers to create various applications. One such application is the SPLUNK® APP FOR VMWARE®, which performs monitoring operations and includes analytics to facilitate diagnosing the root cause of performance problems in a data center based on large volumes of data stored by the SPLUNK® ENTERPRISE system.

This differs from conventional data-center-monitoring systems that lack the infrastructure to effectively store and analyze large volumes of performance information and log data obtained from the data center. In conventional data-center-monitoring systems, this performance data is typically pre-processed prior to being stored, for example, by extracting pre-specified data items from the performance data and storing them in a database to facilitate subsequent retrieval and analysis at search time. However, the rest of the performance data is not saved and is essentially discarded during pre-processing. In contrast, the SPLUNK® APP FOR VMWARE® stores large volumes of minimally processed performance information and log data at ingestion time for later retrieval and analysis at search time when a live performance issue is being investigated.

The SPLUNK® APP FOR VMWARE® can process many types of performance-related information. In general, this performance-related information can include any type of performance-related data and log data produced by virtual machines and host computer systems in a data center. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. For more details about such performance metrics, please see U.S. patent Ser. No. 14/167,316 filed Jan. 29, 2014, which is hereby incorporated herein by reference. Also, see "vSphere Monitoring and Performance," Update 1, vSphere 5.5, EN-001357-00, http://pubs.vmware.com/vsphere-55/topic/com.vmware.ICbase/PDF/vsphere-esxi-vcenter-server-551-monitoring-performance-guide.pdf.

To facilitate retrieving information of interest from performance data and log files, the SPLUNK® APP FOR VMWARE® provides pre-specified schemas for extracting relevant values from different types of performance-related event data, and also enables a user to define such schemas.

Figure 11C:
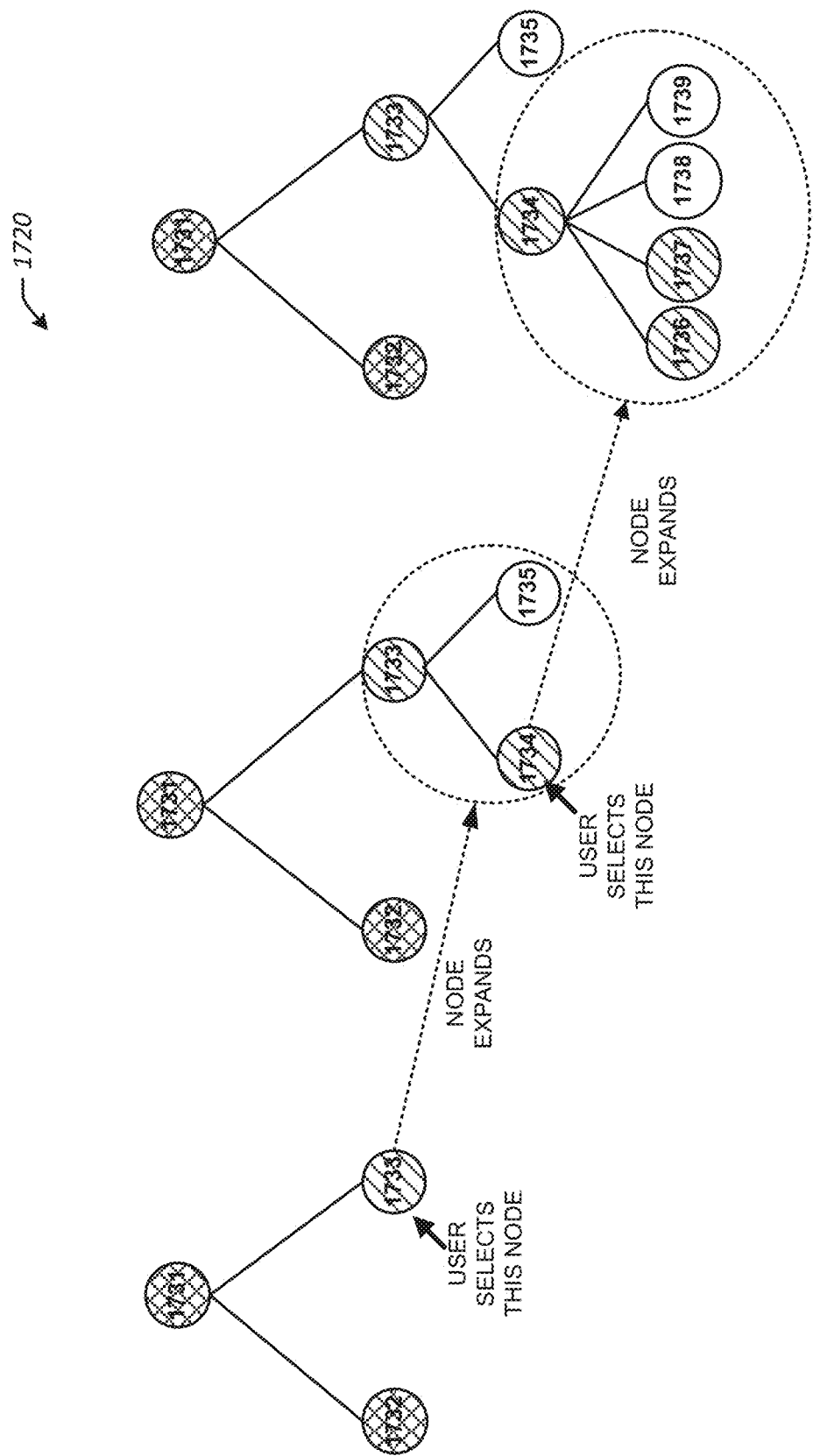
FIG. 11C illustrates an example proactive monitoring tree in accordance with the disclosed embodiments.
Figure 11D:
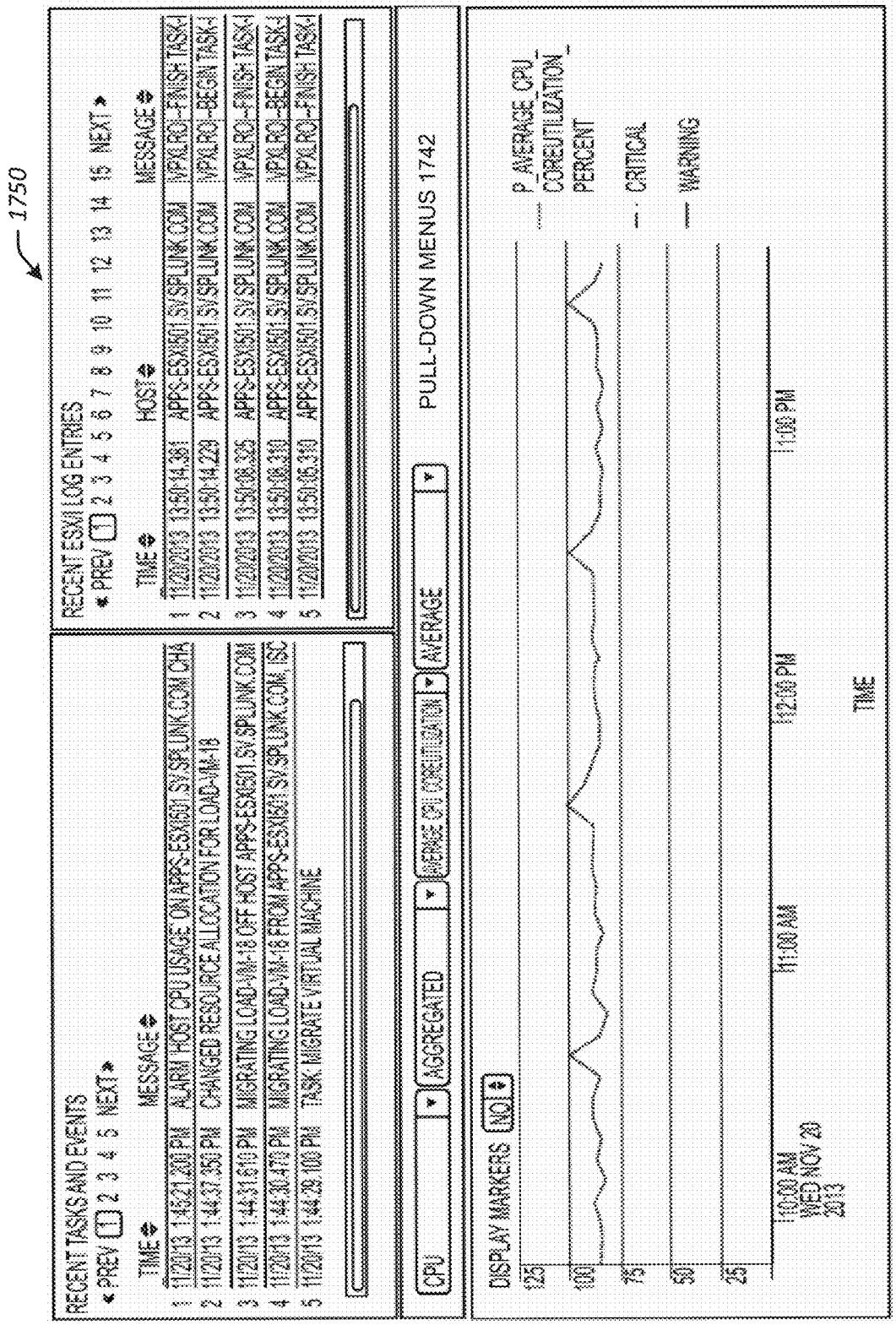
FIG. 11D illustrates an example screen displaying both log data and performance data in accordance with the disclosed embodiments.

The SPLUNK® APP FOR VMWARE® additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Exemplary node-expansion operations are illustrated in FIG. 11C, wherein nodes 1733 and 1734 are selectively expanded. Note that nodes 1731-1739 can be displayed using different patterns or colors to represent different performance states, such as a critical state, a warning state, a normal state, or an unknown/offline state. The ease of navigation provided by selective expansion in combination with the associated performance-state information enables a user to quickly diagnose the root cause of a performance problem. The proactive monitoring tree is described in further detail in U.S. patent application Ser. No. 14/235,490, filed on Apr. 15, 2014, which is hereby incorporated by reference.

The SPLUNK® APP FOR VMWARE® also provides a user interface that enables a user to select a specific time range and then view heterogeneous data, comprising events, log data and associated performance metrics, for the selected time range. For example, the screen illustrated in FIG. 11D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, filed on Jan. 29, 2014, which is hereby incorporated by reference.

Further modifications and embodiments of various aspects of the disclosure will be apparent to those skilled in the art in view of this description. Accordingly, this description is to be construed as illustrative only and is for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

It will be appreciated that the methods described are example embodiments of methods that may be employed in accordance with the techniques described herein. The methods may be modified to facilitate variations of their implementation and use. The order of the methods and the operations provided therein may be changed, and various elements may be added, reordered, combined, omitted, modified, etc. Portions of the methods may be implemented in software, hardware, or a combination thereof. Some or all of the portions of the methods may be implemented by one or more of the processors/modules/applications described herein.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the phrase "based on" does not limit the associated operation to being solely based on a particular item. Thus, for example, processing "based on" data A may include processing based at least in part on data A and based at least in part on data B unless the content clearly indicates otherwise. Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A method comprising:
receiving input data from a data source;
receiving a modular visualization, the modular visualization comprising a variable field associated with a visualization and instructions for rendering the visualization using the input data and the variable field, wherein the visualization is graphically rendered using the input data and values associated with the variable field, wherein the input data comprises events and wherein the events comprise time-stamped machine-generated data, wherein the variable field is presented to a user via a graphical user interface (GUI), wherein the variable field comprises a value operable to be changed by a user through the (GUI);
causing display of a variable field graphical element corresponding to the variable field within the graphical user interface (GUI), wherein the value of the variable field is operable to be changed by the user using the variable field graphical element associated with the variable field, and wherein changing the value of the variable field using the variable field graphical element initiates a re-rendering of the visualization using the input data and the value of the variable field;
responsive to a user interacting with the variable field graphical element, accepting a user input that defines a value for the variable field; and
rendering the visualization based on the modular visualization and the value of the variable field to produce a rendered visualization.

2. The method of claim 1, wherein the rendering of the visualization is further based on the events.

3. The method of claim 1 further comprising displaying on a display screen the rendered visualization.

4. The method of claim 1 wherein the GUI comprises the visualization.

5. The method of claim 1, wherein the GUI comprises the visualization, wherein the GUI is an interactive GUI, and wherein the GUI is operable to display visualizations native to an application program and visualizations received from third parties.

6. The method of claim 1 further comprising:
responsive to a user interacting with the variable field graphical element, accepting another user input that defines another value of the variable field;
re-rendering the visualization based on the modular visualization and the another value of the variable field to produce a re-rendered visualization; and
displaying on a display screen the re-rendered visualization.

7. The method of claim 1, further comprising:
responsive to a user interacting with the variable field graphical element, accepting another user input that defines another value of the variable field;
re-rendering the visualization based on the modular visualization and the another value of the variable field to produce a re-rendered visualization; and
displaying on a display screen the re-rendered visualization, wherein the re-rendering is further based on the events.

8. The method of claim 1 wherein the receiving comprises receiving a plurality of modular visualizations with an associated plurality of variable fields, each variable field associated with a respective modular visualization of the plurality of modular visualizations and further comprising:
receiving a plurality of labels, each label associated with a respective modular visualization of the plurality of modular visualizations; and
registering, in a registry, each label and associated modular visualization of the plurality of labels and the plurality of modular visualizations.

9. The method of claim 1 wherein the receiving comprises receiving a plurality of modular visualizations with an associated plurality of variable fields, each variable field associated with a respective modular visualization of the plurality of modular visualizations and further comprising:

receiving a plurality of labels, each label associated with a respective modular visualization of the plurality of modular visualizations; and registering, in a registry, each label and associated modular visualization of the plurality of labels and the plurality of modular visualizations;

displaying, within the GUI, a label selection graphical element;

receiving a user selection of a particular modular visualization based on a user interaction with the label selection graphical element selecting a particular label associated with the particular modular visualization; and wherein the rendering the visualization comprises rendering, within the GUI, a visualization corresponding to the particular modular visualization responsive to the user interaction with the label selection graphical element selecting the particular label.

10. The method of claim 1, wherein the GUI further comprises a menu panel comprising a menu element corresponding to the visualization, and further comprising:

receiving user input, via the menu panel of the GUI, an indication of a selection of the menu element.

11. The method of claim 1, wherein the GUI further comprises a menu panel comprising a menu element corresponding to the visualization, and further comprising:

receiving user input, via the menu panel of the GUI, an indication of a selection of the menu element, wherein the menu panel corresponds to a native visualization.

12. The method of claim 1, wherein the GUI further comprises a menu panel comprising a menu element corresponding to the visualization, and further comprising:

receiving user input, via the menu panel of the GUI, an indication of a selection of the menu element, wherein the menu panel corresponds to a visualization received from a third party.

13. The method of claim 1, wherein the rendering the visualization comprises:

receiving the events from a plurality of searches; and rendering the visualization using the events from the plurality of searches.

14. The method of claim 1, further comprising:

registering the modular visualization within a registry as part of a framework for visualizations of events.

15. The method of claim 1, further comprising:

receiving visualization editor options for the modular visualization; and storing the instructions, the variable field, and the visualization editor options in computer readable memory.

16. The method of claim 1, further comprising:

transferring the instructions and the variable field to a specified device.

17. The method of claim 1, wherein the instructions for rendering the visualization are in a syntax substantially compatible with JavaScript.

18. The method of claim 1, further comprising:

receiving, via the variable field graphical element, an indication of a change in the value of the variable field to a second value;

rendering a second visualization using the modular visualization and the second value; and causing display of the GUI using the second visualization and the variable element.

19. The method of claim 1, further comprising:

receiving the events from one or more indexers.

20. The method of claim 1, wherein the variable field graphical element is one of a slider, a checkbox, a text field, a drop down menu, a dial element, a spinner, or a combination box.

21. The method of claim 1, further comprising:

receiving a second variable field, wherein a change in a value of the second variable field results in the change in the visualization; and wherein the GUI further comprises a second variable field graphical element corresponding to the second variable field.

22. The method of claim 1 wherein the events are obtained using a predefined search criteria for searching the machine-generated data.

23. The method of claim 1, wherein the events are obtained from at least one of activity logs, error logs, configuration files, network packets, application data, virtual machine data, or database records.

24. The method of claim 1, wherein the rendering the visualization further comprises:

extracting field values from the events using one or more extraction rules of a late-binding schema; and rendering the visualization using the field values.

25. The method of claim 1, wherein the events comprise aggregated heterogeneous machine-generated data generated by at least one of a server, a database, an application, or a network.

26. The method of claim 1, wherein the events are extracted from machine-generated data based at least in part on a search query.

27. The method of claim 1, further comprising:

generating a search query using one or more values associated with the modular visualization and the value of the variable field;

submitting the search query to a search system; and receiving the events from the search system, wherein the search system obtained the events using the search query.

28. The method of claim 1, further comprising:

transmitting the instructions for rendering the visualization to a different user.

29. The method of claim 1, further comprising:

causing display of an updated GUI comprising the visualization and one or more additional visualizations rendered in accordance with one or more third party modular visualizations.

30. The method of claim 1, further comprising:

rendering the visualization using two or more data sets of events of machine-generated data; and causing display of an updated GUI comprising the visualization depicting the two or more data sets.

31. The method of claim 1, wherein the data source is one or more applications, application servers, web servers, databases, networks, virtual machines, telecom equipment, operating systems, and sensors.

32. A system comprising:

at least one memory storing computer-executable instructions; and at least one processor, wherein the at least one processor is configured to access the at least one memory and to execute the computer-executable instructions to:

receive input data from a data source;

receive a modular visualization, the modular visualization comprising a variable field associated with a visualization and instructions for rendering the visualization using the input data and the variable field, wherein the visualization is graphically rendered using the input data and values associated with the variable field, wherein the input data comprises events and wherein the events comprise time-stamped machine-generated data, wherein the variable field is presented to a user via a graphical user interface (GUI), wherein the variable field comprises a value operable to be changed by a user through the (GUI);

cause display of a variable field graphical element corresponding to the variable field within the graphical user interface (GUI), wherein the value of the variable field is operable to be changed by the user using the variable field graphical element associated with the variable field, and wherein changing the value of the variable field using the variable field graphical element initiates a re-rendering of the visualization using the input data and the value of the variable field;

responsive to a user interacting with the variable field graphical element, accept a user input that defines a value for the variable field; and render the visualization based on the modular visualization and the value of the variable field to produce a rendered visualization.

33. The system of claim 32, wherein the GUI is an interactive GUI, and wherein the GUI is operable to display visualizations native to an application program and visualizations received from third parties.

34. The system of claim 32 wherein the processor is further configure to access the least one memory and to execute the computer-executable instructions to:

responsive to a user interact with the variable field graphical element, accepting another user input that defines another value of the variable field;

re-render the visualization based on the modular visualization and the another value of the variable field to produce a re-rendered visualization; and display on a display screen the re-rendered visualization.

35. A non-transitory computer-readable medium storing computer-executable instructions which, when executed by a processor, cause the processor to perform operations comprising:

receiving input data from a data source;

receiving a modular visualization, the modular visualization comprising a variable field associated with a visualization and instructions for rendering the visualization using the input data and the variable field, wherein the visualization is graphically rendered using the input data and values associated with the variable field, wherein the input data comprises events and wherein the events comprise time-stamped machine-generated data, wherein the variable field is presented to a user via a graphical user interface (GUI), wherein the variable field comprises a value operable to be changed by a user through the (GUI);

causing display of a variable field graphical element corresponding to the variable field within the graphical user interface (GUI), wherein the value of the variable field is operable to be changed by the user using the variable field graphical element associated with the variable field, and wherein changing the value of the variable field using the variable field graphical element initiates a re-rendering of the visualization using the input data and the value of the variable field;

responsive to a user interacting with the variable field graphical element, accepting a user input that defines a value for the variable field; and rendering the visualization based on the modular visualization and the value of the variable field to produce a rendered visualization.

36. The non-transitory computer-readable medium of claim 35, wherein the rendering of the visualization is further based on the events.

37. The non-transitory computer-readable medium of claim 35, wherein the GUI is an interactive GUI, and wherein the GUI is operable to display visualizations native to an application program and visualizations received from third parties.

38. The non-transitory computer-readable medium of claim 35, wherein the operations further comprise:

responsive to a user interacting with the variable field graphical element, accepting another user input that defines another value of the variable field;

re-rendering the visualization based on the modular visualization and the another value of the variable field to produce a re-rendered visualization; and displaying on a display screen the re-rendered visualization.

39. The non-transitory computer-readable medium of claim 35, wherein the receiving comprises receiving a plurality of modular visualizations with an associated plurality of variable fields, each variable field associated with a respective modular visualization of the plurality of modular visualizations and wherein the operations further comprise:

receiving a plurality of labels, each label associated with a respective modular visualization of the plurality of modular visualizations; and registering, in a registry, each label and associated modular visualization of the plurality of labels and the plurality of modular visualizations.

40. The non-transitory computer-readable medium of claim 35 wherein the receiving comprises receiving a plurality of modular visualizations with an associated plurality of variable fields, each variable field associated with a respective modular visualization of the plurality of modular visualizations and wherein the operations further comprise:

receiving a plurality of labels, each label associated with a respective modular visualization of the plurality of modular visualizations; and registering, in a registry, each label and associated modular visualization of the plurality of labels and the plurality of modular visualizations;

displaying, within the GUI, a label selection graphical element;

receiving a user selection of a particular modular visualization based on a user interaction with the label selection graphical element selecting a particular label associated with the particular modular visualization; and wherein the rendering the visualization comprises rendering, within the GUI, a visualization corresponding to the particular modular visualization responsive to the user interaction with the label selection graphical element selecting the particular label.

* * * * *